(12) United States Patent
Wang et al.

(10) Patent No.: US 11,343,111 B2
(45) Date of Patent: May 24, 2022

(54) QUOTA MANAGEMENT IN MOBILE EDGE COMPUTING (MEC)

(71) Applicant: Nokia Solutions and Networks Oy, Espoo (FI)

(72) Inventors: Zhi Wang, Murray Hill, NJ (US); Yigang Cai, Naperville, IL (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 16/978,465

(22) PCT Filed: Mar. 20, 2018

(86) PCT No.: PCT/US2018/023407
§ 371 (c)(1),
(2) Date: Sep. 4, 2020

(87) PCT Pub. No.: WO2019/182573
PCT Pub. Date: Sep. 26, 2019

(65) Prior Publication Data
US 2021/0099316 A1    Apr. 1, 2021

(51) Int. Cl.
*H04L 12/14* (2006.01)
*H04W 76/11* (2018.01)
*H04M 15/00* (2006.01)
*H04W 4/24* (2018.01)

(52) U.S. Cl.
CPC ........ *H04L 12/1407* (2013.01); *H04M 15/64* (2013.01); *H04M 15/66* (2013.01); *H04M 15/8228* (2013.01); *H04W 4/24* (2013.01); *H04W 76/11* (2018.02)

(58) Field of Classification Search
CPC ..... H04L 12/1407; H04W 76/11; H04W 4/24; H04M 15/64; H04M 15/66; H04M 15/8228
USPC .......................................... 370/329
See application file for complete search history.

(56) References Cited

U.S. PATENT DOCUMENTS

| | | | |
|---|---|---|---|
| 9,179,009 B1* | 11/2015 | Subramanian | H04M 15/66 |
| 2013/0122856 A1* | 5/2013 | Kalmbach | H04L 67/289 |
| | | | 455/405 |
| 2016/0353268 A1* | 12/2016 | Senarath | H04L 41/5051 |
| 2018/0077294 A1* | 3/2018 | Rasanen | H04M 15/8214 |
| 2019/0173681 A1* | 6/2019 | Jia | H04M 15/8278 |

(Continued)

FOREIGN PATENT DOCUMENTS

| | | | |
|---|---|---|---|
| GN | 106817686 A | 6/2017 | |
| WO | WO 2016134772 | * 9/2016 | H04L 12/14 |

*Primary Examiner* — Mong-Thuy T Tran
(74) *Attorney, Agent, or Firm* — Duft & Bornsen, PC

(57) ABSTRACT

Systems, methods, and software for performing online charging in next generation networks. In one embodiment, a Mobile Edge Computing (MEC) server is implemented at a Radio Access Network (RAN) of a next generation network. The MEC server hosts a plurality of edge applications provisioned to provide MEC services for a session. The MEC server communicates with a Session Management Function (SMF) of the next generation network to acquire a quota of service units for the session. The MEC server then manages the quota by allocating slices of the quota to the edge applications, and transmitting messages to the edge applications indicating the slices allocated to the edge applications.

20 Claims, 16 Drawing Sheets

(56) References Cited

U.S. PATENT DOCUMENTS

| | | | |
|---|---|---|---|
| 2019/0386894 A1* | 12/2019 | Hu | H04L 65/1069 |
| 2020/0045514 A1* | 2/2020 | Chai | H04L 12/14 |
| 2020/0100075 A1* | 3/2020 | Chai | H04W 80/10 |
| 2020/0169639 A1* | 5/2020 | Chai | H04M 15/64 |
| 2020/0220982 A1* | 7/2020 | Chai | H04L 12/1407 |

* cited by examiner

QUOTA MANAGEMENT IN MOBILE EDGE COMPUTING (MEC)

RELATED APPLICATIONS

The present application is a National Stage entry of PCT application No. PCT/US2018/023407 filed on Mar. 20, 2018, which is fully incorporated herein by reference.

TECHNICAL FIELD

This disclosure is related to the field of communication systems and, in particular, to credit control for online charging.

BACKGROUND

Service providers or carriers typically offer numerous voice and data services to end users of mobile phones or other mobile terminals. Some examples of voice services are voice calls, call forwarding, call waiting, etc. Some examples of data services are Internet access, streaming audio, streaming video, online gaming, Internet Protocol television (IP-TV), etc. A "carrier" is a term commonly used in the United States and Canada to refer to a company that provides these types of voice or data services. Examples of carriers include Verizon Wireless®, T-Mobile®, AT&T®, etc.

The first types of wireless or mobile networks that were introduced by carriers were First Generation (1G) and Second Generation (2G) networks. 1G networks provided voice services via analog signals, and then evolved into 2G networks that provided voice services via digital signals. Mobile communications then evolved into Third Generation (3G) (including 2.5G) networks that provided both voice services and data services. For example, 3G networks are able to provide wireless voice telephony, as well as data services such as Internet access, video calls, mobile TV, etc. Some of the 3G networks implemented by carriers were Universal Mobile Telecommunications System (UMTS) networks, Enhanced Voice Data Optimized (EV-DO) networks, General Packet Radio Service (GPRS) networks, etc. Mobile communications then evolved into Fourth Generation (4G) technologies over Packet-Switched (PS) networks, such as Long Term Evolution (LTE). 4G networks are essentially enhancements to 3G networks in terms of data speeds. For example, a 3G network can provide data speeds of about 3.5 Mbit/sec, while a 4G network can provide data speeds of 100 Mbit/sec. Next generation networks, such as Fifth Generation (5G), denotes the next major phase of mobile telecommunications standards beyond the current 4G standards. In addition to faster speeds, next generation networks will need to meet new use cases in terms of latency, throughput, capacity, and availability, such as Internet of Things (IoT), broadcast services, etc. The International Telecommunication Union (ITU) has classified 5G mobile network services into three categories: Enhanced Mobile Broadband (eMBB), Ultra-reliable and Low-latency Communications (uRLLC), and Massive Machine Type Communications (mMTC). eMBB focuses on services that have high bandwidth requirements, such as High Definition (HD) videos, Virtual Reality (VR), and Augmented Reality (AR). uRLLC focuses on latency-sensitive services, such as automated driving and remote management. mMTC focuses on services that include high requirements for connection density, such as smart city and smart agriculture.

In comparison to 4G networks, next generation networks are enhanced in terms of radio access and network architecture. Next generation networks intend to utilize new regions of the radio spectrum for Radio Access Networks (RANs), such as centimeter and millimeter wave bands. Also, the architecture of next generation networks has the functional elements of the user plane separated from the control plane. The user plane carries user traffic, and the control plane carries signaling in the network. With Software-Defined Networking (SDN) and Network Functions Virtualization (NFV) supporting an underlying physical architecture, the functional elements of next generation networks are referred to as network functions. A network function may be implemented either as a network element on dedicated hardware, as a software instance running on dedicated hardware, or as a virtualized function instantiated on an appropriate platform, such as a cloud infrastructure. A network function may be implemented in the user plane or the control plane. One network function in the user plane is a User Plane Function (UPF), and network functions in the control plane include an Access and Mobility Function (AMF), a Session Management Function (SMF), and a Policy Control Function (PCF). Separating the user plane and the control plane allows the resources for each plane to be scaled independently.

MEC is a technology that enables Information Technology (IT) services and cloud computing services at the edge of a mobile network (i.e., within the RAN) and in close proximity to mobile subscribers. MEC is considered a key emerging technology for next generation networks, as processing capability at the edge of the network (e.g., inside or adjacent to a base station, a WiFi hotspot server, etc.) allows for lower latency and efficient service delivery. A MEC platform is typically a virtualized platform that hosts one or more edge applications. The edge applications may operate on downstream data from a core network, and/or on upstream data from mobile devices.

Although a basic framework for next generation networks has been suggested, charging standards have yet to be defined.

SUMMARY

Embodiments described herein provide mechanisms for online charging in next generation networks. A MEC server of a RAN hosts one or more edge applications configured to provide MEC services to mobile devices (e.g., UEs) within a coverage area of the RAN. The MEC server also provides quota management for the edge applications provisioned to provide MEC services for a session. The MEC server acquires a quota of service units from an SMF for a session, and manages the quota by allocating slices of the quota to the edge applications. When edge applications change during the session, MEC services change during a session, application handover occurs, etc., the MEC server rebalances and reallocates the quota among the edge applications provisioned to provide MEC services. Providing quota management in the MEC server is advantageous in that the edge applications do not have to interact with the SMF or the charging domain, and the SMF only has to interact with the MEC server during a session.

One embodiment comprises a system that includes a MEC server implemented at a RAN of a next generation network that includes a base station. The MEC server comprises an interface component configured to communicate with a Session Management Function (SMF) element implemented in a control plane of the next generation network. The controller is configured to implement a plurality of edge applications provisioned to provide MEC services for a session requested by the UE in range of the base station. The controller is configured to implement a virtual Charging Trigger Function (CTF) configured to receive a response from the SMF element through the interface component indicating a quota of service units granted for the session, to manage the quota by allocating slices of the quota to the edge applications, and to transmit messages to the edge applications indicating the slices allocated to the edge applications.

In another embodiment, the response received from the SMF element indicates policy rules for the session involving the UE defined by a Policy Control Function (PCF) element implemented in the control plane of the next generation network. The virtual CTF is configured to allocate the slices of the quota to the edge applications based on the policy rules.

In another embodiment, the virtual CTF is configured to detect a change to the plurality of edge applications provisioned to provide the MEC services for the session, to transmit a return request to the edge applications requesting return of unused service units of the slices, to add the unused service units to remaining service units of the quota, to manage the quota by allocating new slices of the remaining service units of the quota to the edge applications, and to transmit the messages to the edge applications indicating the new slices allocated to the edge applications.

In another embodiment, the virtual CTF is configured to identify a change to a MEC service provided by an edge application of the plurality of edge applications, to transmit a return request to the edge application requesting return of unused service units of a slice previously allocated to the edge application, to add the unused service units to remaining service units of the quota, to allocate a new slice of the remaining service units of the quota to the edge application based on the change to the MEC service, and to transmit a return response to the edge application indicating the new slice allocated to the edge application.

In another embodiment, the virtual CTF is configured to receive an update request from an edge application of the plurality of edge applications requesting a new slice, to allocate the new slice of remaining service units of the quota to the edge application, and to transmit a return response to the edge application indicating the new slice allocated to the edge application.

In another embodiment, the virtual CTF is configured to determine that the quota is consumed during the session, to transmit a replenish request to the SMF element through the interface component requesting a new quota of service units for the session, and to receive a replenish response from the SMF element through the interface component indicating the new quota of service units.

In another embodiment, the virtual CTF is configured to determine that the quota is consumed during the session, and to transition from online charging to offline charging for the session responsive to a determination that the quota is consumed during the session.

In another embodiment, the virtual CTF is configured to determine a quota consumption status, to determine when a quota threshold is reached, to modify the edge applications or change a QoS Flow ID (QFI) to lower a tariff rate for the session, and to shrink an edge application list that shares the quota to make a remaining quota available for a limited set of the edge applications.

Another embodiment comprises a method operable in a MEC server. The method comprises implementing a plurality of edge applications provisioned to provide MEC services for a session requested by a UE in range of the base station, implementing a virtual CTF at the MEC server, receiving a response from an SMF element indicating a quota of service units granted for the session, managing the quota by allocating slices of the quota to the edge applications, and transmitting messages from the virtual CTF to the edge applications indicating the slices allocated to the edge applications.

In another embodiment, the response received from the SMF element indicates policy rules for the session involving the UE defined by a PCF element implemented in the control plane of the next generation network. The step of allocating the slices comprises allocating the slices of the quota to the edge applications based on the policy rules. In another embodiment, the method further comprises detecting a change to the plurality of edge applications provisioned to provide the MEC services for the session, transmitting a return request from the virtual CTF to the edge applications requesting return of unused service units of the slices, adding the unused service units to remaining service units of the quota, managing the quota at the virtual CTF by allocating new slices of the remaining service units of the quota to the edge applications, and transmitting the messages from the virtual CTF to the edge applications indicating the new slices allocated to the edge applications.

In another embodiment, the method further comprises identifying a change to a MEC service provided by an edge application of the plurality of edge applications, transmitting a return request from the virtual CTF to the edge application requesting return of unused service units of a slice previously allocated to the edge application, adding the unused service units to remaining service units of the quota, allocating a new slice of the remaining service units of the quota to the edge application based on the change to the MEC service, and transmitting a return response from the virtual CTF to the edge application indicating the new slice allocated to the edge application.

In another embodiment, the method further comprises receiving an update request at the virtual CTF from an edge application of the plurality of edge applications requesting a new slice, allocating the new slice of remaining service units of the quota to the edge application, and transmitting a return response from the virtual CTF to the edge application indicating the new slice allocated to the edge application.

In another embodiment, the method further comprises determining that the quota is consumed during the session, transmitting a replenish request from the virtual CTF to the SMF element requesting a new quota of service units for the session, and receiving a replenish response at the virtual CTF from the SMF element indicating the new quota of service units.

Another embodiment comprises a non-transitory computer readable medium embodying programmed instructions executed by one or more processors, wherein the instructions direct the processors to implement a MEC server. The MEC server is configured to communicate with an SMF element implemented in a control plane of a next generation network. The MEC server is configured to implement a plurality of edge applications provisioned to provide MEC services for a session requested by a UE. The MEC server is configured to receive a response from the SMF element indicating a quota of service units granted for the session, to manage the quota by allocating slices of the quota to the edge applications, and to transmit messages to the edge applications indicating the slices allocated to the edge applications.

Another embodiment comprises a MEC server that includes a means for communicating with an SMF element implemented in a control plane of a next generation network. The MEC server includes a means for implementing a plurality of edge applications provisioned to provide MEC services for a session requested by a UE. The MEC server includes a means for receiving a response from the SMF element indicating a quota of service units granted for the session, a means for managing the quota by allocating slices of the quota to the edge applications, and a means for transmitting messages to the edge applications indicating the slices allocated to the edge applications.

The above summary provides a basic understanding of some aspects of the specification. This summary is not an extensive overview of the specification. It is intended to neither identify key or critical elements of the specification nor delineate any scope of the particular embodiments of the specification, or any scope of the claims. Its sole purpose is to present some concepts of the specification in a simplified form as a prelude to the more detailed description that is presented later.

DESCRIPTION OF THE DRAWINGS

Some embodiments of the invention are now described, by way of example only, and with reference to the accompanying drawings. The same reference number represents the same element or the same type of element on all drawings.

DESCRIPTION OF EMBODIMENTS

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
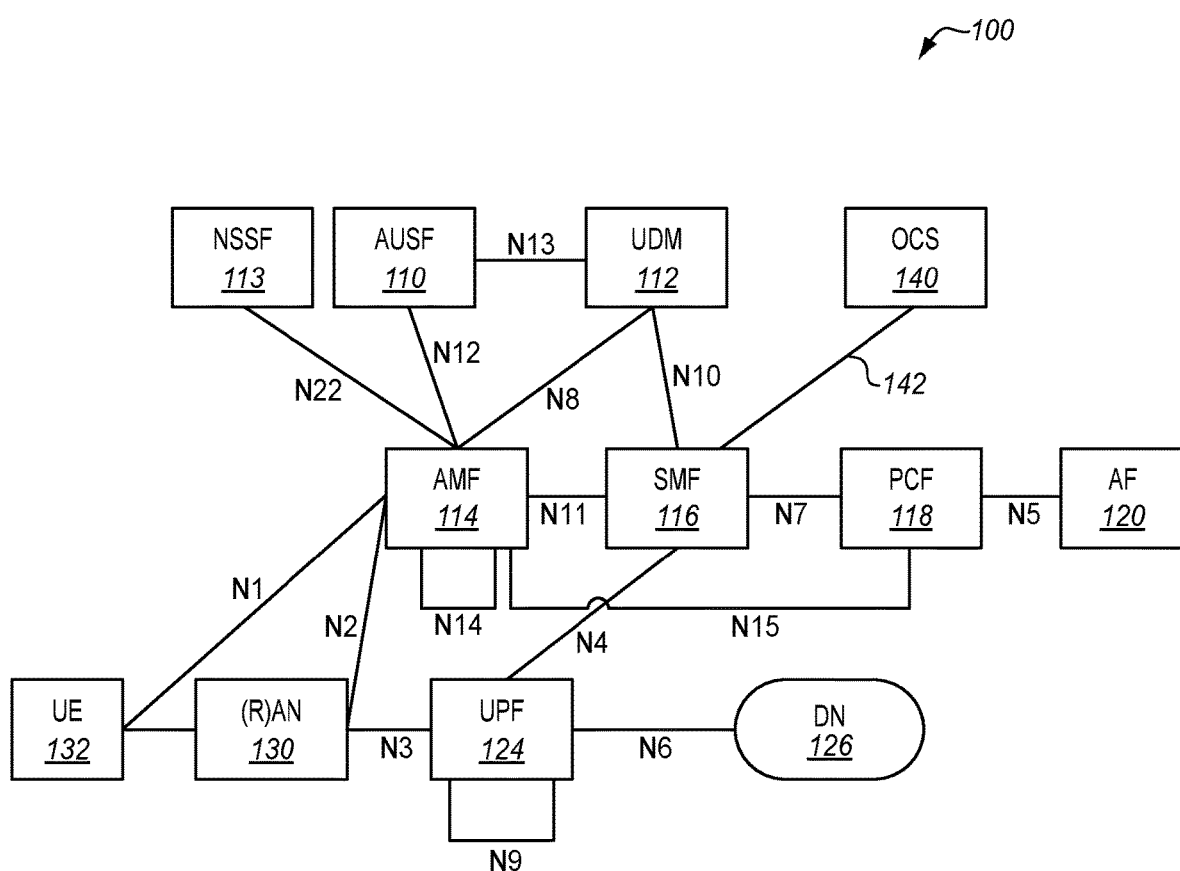
FIG. 1 illustrates a non-roaming architecture of a next generation network in an illustrative embodiment.

FIG. 1 illustrates a non-roaming architecture 100 of a next generation network in an illustrative embodiment. The architecture in FIG. 1 is a reference point representation, as is further described in 3GPP TS 23.501 (v1.5.0), which is incorporated by reference as if fully included herein. The control plane of architecture 100 includes Authentication Server Function (AUSF) 110, a Unified Data Management (UDM) 112, a Network Slice Selection Function (NSSF) 113, an Access and Mobility Management Function (AMF) 114, a Session Management Function (SMF) 116, a Policy Control Function (PCF) 118, and an Application Function (AF) 120. The user plane of architecture 100 includes one or more User Plane Functions (UPF) 124 that communicate with a Data Network (DN) 126. A (Radio) Access Network ((R)AN) 130 and User Equipment (UE) 132 are able to access the control plane and the user plane of the core network. (R)AN 130 is a type of communication network where the last link to end user devices (e.g., UE) is wireless.

AUSF 110 is configured to support authentication of UE 132. UDM 112 is configured to store subscription data/information for UE 132. UDM 112 may store three types of user data: subscription, policy, and session-related context (e.g., UE location). AMF 114 is configured to provide UE-based authentication, authorization, mobility management, etc. SMF 116 is configured to provide the following functionality: session management (SM), UE Internet Protocol (IP) address allocation and management, selection and control of UPF 124, termination of interfaces towards PCF 118, control part of policy enforcement and Quality of Service (QoS), lawful intercept, termination of SM parts of NAS messages, Downlink Data Notification (DNN), roaming functionality, handle local enforcement to apply QoS for Service Level Agreements (SLAs), charging data collection and charging interface, etc. If UE 132 has multiple sessions, different SMFs may be allocated to each session to manage them individually and possibly provide different functionalities per session. PCF 118 is configured to support a unified policy framework to govern network behavior, and to provide policy rules to control plane functions for QoS enforcement, charging, access control, traffic routing, etc. AF 120 provides information on a packet flow to PCF 118. Based on the information, PCF 118 is configured to determine policy rules about mobility and session management to make AMF 114 and SMF 116 operate properly.

UPF 124 supports various user plane operations and functionalities as part of a service, such as packet routing and forwarding, traffic handling (e.g., QoS enforcement), an anchor point for Intra-RAT/Inter-RAT mobility (when applicable), packet inspection and policy rule enforcement, lawful intercept (UP collection), traffic accounting and reporting, etc. DN 126 is not part of the core network, and provides Internet access, operator services, 3rd party services, etc.

Architecture 100 includes the following reference points. The N1 reference point is implemented between UE 132 and AMF 114. The N2 reference point is implemented between (R)AN 130 and AMF 114. The N3 reference point is implemented between (R)AN 130 and UPF 124. The N4 reference point is implemented between the SMF 116 and UPF 124. The N5 reference point is implemented between PCF 118 and AF 120. The N6 reference point is implemented between UPF 124 and DN 126. The N7 reference point is implemented between the SMF 116 and PCF 118. The N8 reference point is implemented between UDM 112 and AMF 114. The N9 reference point is implemented between two UPFs 124. The N10 reference point is implemented between UDM 112 and SMF 116. The N11 reference point is implemented between AMF 114 and SMF 116. The N12 reference point is implemented between AMF 114 and AUSF 110. The N13 reference point is implemented between UDM 112 and AUSF 110. The N14 reference point is implemented between two AMFs. The N15 reference point is implemented between PCF 118 and AMF 114 in the case of a non-roaming scenario. The N22 reference point is implemented between NSSF 113 and AMF 114.

AMF 114, SMF 116, PCF 118, UPF 124, etc., of architecture 100 are referred to herein as "elements" or "network elements". An "element" includes functions, operations, etc., and the underlying hardware or physical devices (e.g., processors) that are programmed to perform the functions. The elements are part of a system within the next generation network that provide connectivity and other functions for a session.

Architecture 100 also includes an Online Charging System (OCS) 140 that is communicatively coupled to SMF element 116 via a reference point 142. OCS 140 comprises a server, device, apparatus, or equipment (including hardware) that provides online charging for services provided in a next generation network, such as a 5G network. Online charging is a charging mechanism where charging information can affect, in real-time, the service rendered and therefore a direct interaction of the charging mechanism with session/service control is required. Online charging can be of two types: session-based or event-based. In event-based charging, a charging event is reported for a single operation. In session-based charging, multiple charging events are reported for a session. A further discussion of charging principles is described in 3GPP TS 32.240 (v15.0.0), which is incorporated by reference as if fully included herein. Although the charging domain is referred to herein as an OCS, it may be a combined online and offline charging system.

In this embodiment, SMF element 116 is enhanced to manage a quota of service units for UPF elements 124 that serve a session of UE 132. As an overview, SMF element 116 interacts with OCS 140 to obtain a quota of service units, and then manages the quota by distributing slices of the quota to the UPF elements 124 provisioned for the session, or to other elements/applications that provide services for the session. Thus, the UPF elements 124 do not interact directly with OCS 140 to obtain their own quota. SMF element 116 interacts with OCS 140 in place of UPF elements 124 to obtain a quota for a session, and then distributes the quota based on policy rules, access type, service type, QoS, etc.

Figure 2:
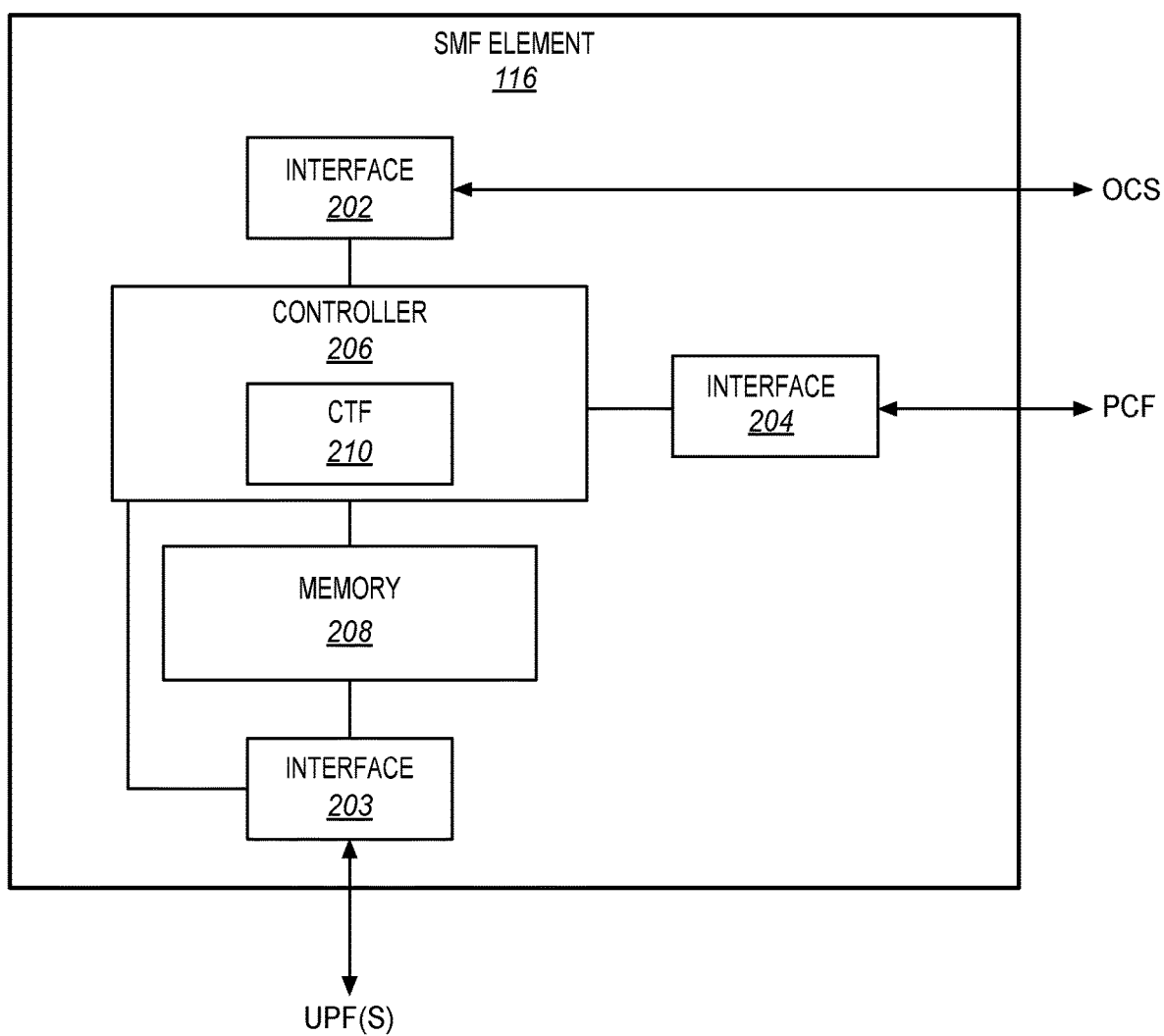
FIG. 2 is a block diagram of an SMF element in an illustrative embodiment.

FIG. 2 is a block diagram of SMF element 116 in an illustrative embodiment. SMF element 116 is an element or apparatus in the control plane of a next generation network that is configured to perform session management for sessions (e.g., Packet Data Unit (PDU) sessions) involving UEs. SMF element 116 includes an interface component 202 configured to directly communicate with OCS 140, an interface component 203 configured to directly communicate with UPF elements 124, and an interface component 204 configured to directly communicate with PCF element 118. Interface components 202-204 may comprise circuitry, logic, hardware, means, etc., that interact with other elements via messages, signals, etc. Interface component 202 may communicate with OCS 140 via a CH reference point that is Diameter-based (e.g., Gy or Gz) or based on another protocol such as HTTP/2. Interface component 202 may communicate with OCS 140 via another reference point that is or may be defined for online charging. Interface component 203 may communicate with UPF elements 124 via the N4 reference point (e.g., Sx). Interface component 204 may communicate with PCF element 118 via the N7 reference point that is Diameter-based (e.g., Gx) or is based on another protocol.

SMF element 116 further includes a controller 206 and a memory 208. Controller 206 represents a component that provides the functions of an SMF element in a next generation network through one or more processors or other physical resources, such as internal circuitry, logic, hardware, means, etc., that provides the functions of an SMF. For instance, controller 206 is configured to dynamically provision UPF elements 124 for a session. Memory 208 is a computer readable storage medium (e.g., ROM or flash memory) or means for storing data, instructions, applications, etc., and is accessible by controller 206. SMF element 116 may include various other components not specifically illustrated in FIG. 2.

Controller 206 implements a Charging Trigger Function (CTF) 210 in this embodiment. CTF 210 the focal point for collecting information pertaining to chargeable events, assembling the information into matching charging events, and sending the charging events towards OCS 140. The charging events are forwarded to OCS 140 in order to obtain authorization for the chargeable event/network resource usage. CTF 210 is configured to delay the actual resource usage until permission by OCS 140 has been granted, to track the availability of resource usage permission (i.e., quota management) during the network resource usage, and enforce termination of network resource usage when permission by OCS 140 is not granted or expires. In this embodiment, CTF 210 is configured to manage a quota for a session on behalf of the UPF elements 124 provisioned for the session. A further description of quota management is described below.

Figure 3:
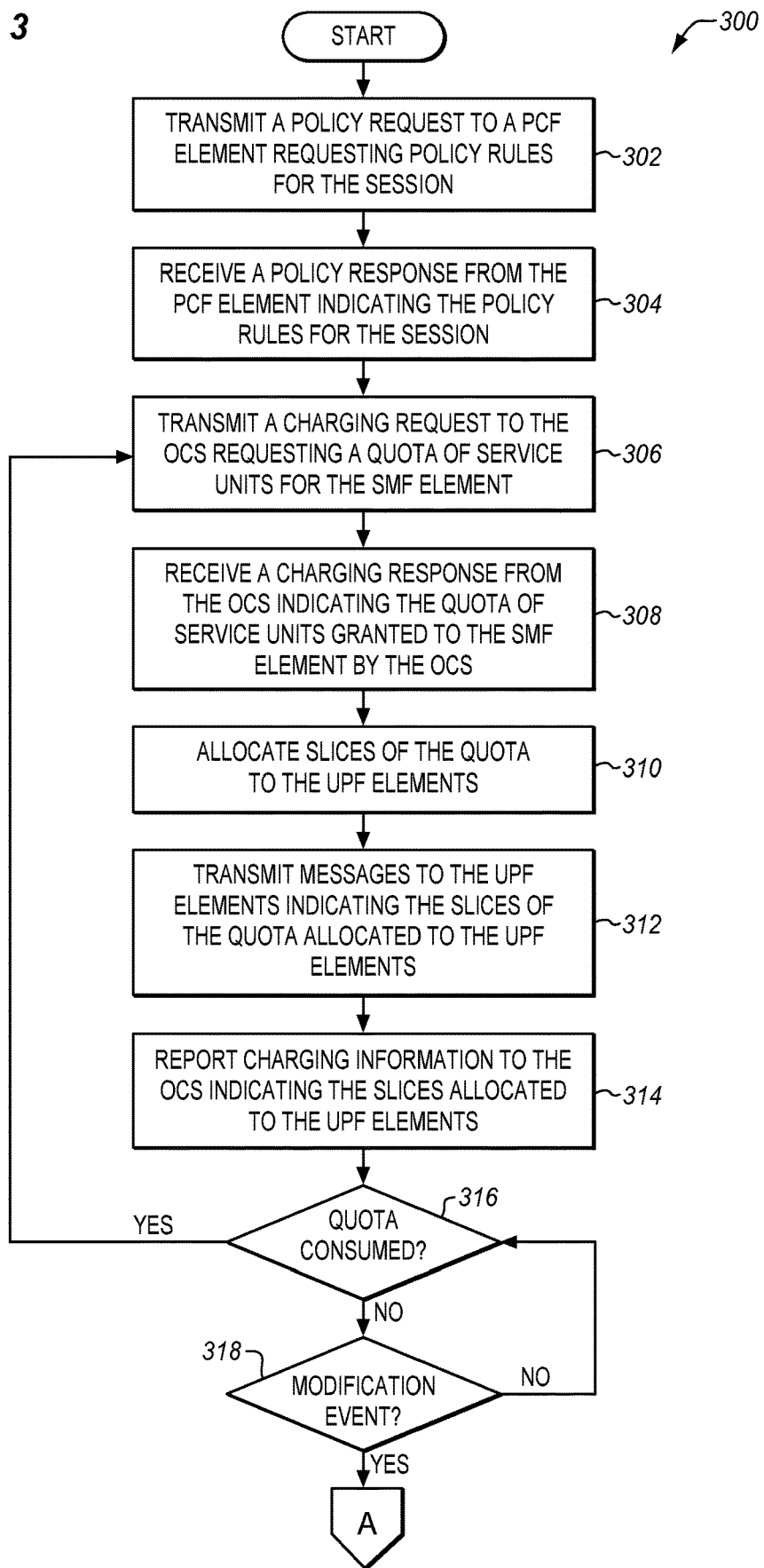
FIG. 3 is a flow chart illustrating a method of performing quota management in an SMF in an illustrative embodiment.
Figure 4:
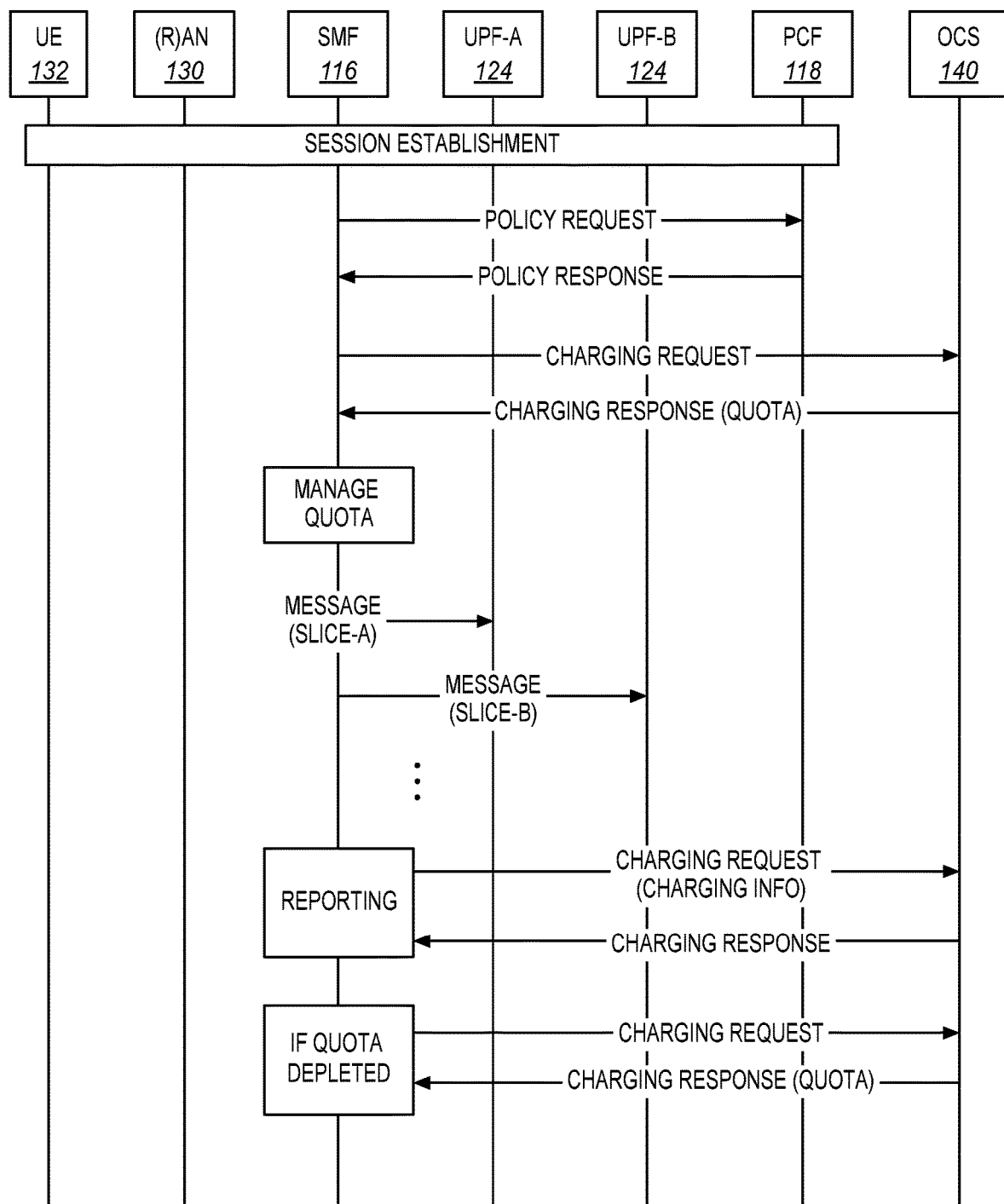
FIG. 4 is a message diagram for quota management in an illustrative embodiment.

FIG. 3 is a flow chart illustrating a method 300 of performing quota management in SMF element 116 in an illustrative embodiment. The steps of method 300 will be described with reference to architecture 100 in FIG. 1 and SMF element 116 in FIG. 2, but those skilled in the art will appreciate that method 300 may be performed in other devices/architectures. The steps of the flow charts described herein are not all inclusive and may include other steps not shown, and the steps may be performed in an alternative order. FIG. 4 is a message diagram for quota management in an illustrative embodiment. The message diagram in FIG. 4 indicates the messaging that may occur between elements, such as for method 300.

One assumption for method 300 is that a session (e.g., a PDU session) is being established or has been established for UE 132. For the session, SMF element 116 provisions multiple UPF elements 124 to serve the session (indicated as UPF-A and UPF-B in FIG. 4). For example, at session establishment, SMF element 116 may select and provision a set of UPF elements 124. In this embodiment, UPF elements 124 do not implement their own independent CTF in order to perform online charging. Instead, CTF 210 of SMF element 116 operates on behalf of UPF elements 124 to perform online charging, and acts as a single CTF for the session. In other words, CTF 210 in SMF element 116 is the sole CTF interacting with OCS 140 for a single session.

To provide quota management, CTF 210/SMF element 116 may acquire policy rules for UE 132 from PCF element 118, such as in response to session establishment. CTF 210 may therefore transmit a policy request to PCF element 118 (through interface component 204) requesting policy rules (e.g., Policy and Charging Control (PCC) rules) for the session involving UE 132 (step 302). CTF 210 may include a variety of information regarding the session in the policy request sent to PCF element 118, such as information regarding PCF element 118, information regarding UPF elements 124 provisioned for the session, QoS information, service information, etc.

In response to the policy request, PCF element 118 may make a policy decision for the session involving UE 132, and generate or formulate the policy rules. The policy rules govern how CTF 210 manages a quota for the session. CTF 210 may then receive a policy response from PCF element 118 indicating the policy rules for UE 132 (step 304). CTF 210 stores the policy rules in a local memory, such as memory 208.

The policy rules for SMF-centric credit pooling may include but are not limited to: allowing one or multiple UPF elements in a session, allowing one quota lump sum or distributed quotas per UPF element, defining the criteria for quota distribution (such as Service Data Flow (SDF), QoS, time window, maximum packets, etc.) if a quota is granted per UPF element, UPF handover criteria including UPF types, service types, etc., SMF quota reservation and limitation in credit pooling, SMF interim reporting mechanism (to either the PCF element or OCS), offline charging diversion if credit quota is consumed during online charging, charging spending limit policies respectively for online and offline charging, and network slicing mode and policy.

In order to manage a quota for the session, CTF 210 first acquires the quota from OCS 140. Thus, CTF 210 transmits a charging request to OCS 140 (through interface component 202) requesting a quota of service units for SMF element 116 (step 306). CTF 210 requests a single credit quota from OCS 140 for the session, and the quota is therefore referred to as a quota for SMF element 116. In response to the charging request, OCS 140 identifies a subscriber profile for the end user of UE 132. The subscriber profile (also referred to as a charging profile) indicates a service plan that the end user has subscribed to, indicates a class of service for the end user, and other relevant charging information. OCS 140 also identifies an account balance for the end user. The account balance is typically maintained in an Account Balance Management Function (ABMF) in OCS 140. The account balance represents the amount of money or other service units that the end user has purchased in advance. When the account balance of the end user is sufficient, OCS 140 may grant a quota or allotment of service units from the account balance of the end user for the session. The quota comprises any portion of the account balance that OCS 140 grants to SMF element 116 for credit control. For example, if the end user has a balance of 200 service units, then OCS 140 may allocate 50 service units for the session to SMF element 116. If OCS 140 does not grant a quota, then CTF 210 will receive a charging response from the OCS 140 (through interface component 202) indicating that the session is not allowed (i.e., including a cause code). CTF 210 will therefore terminate the session or block session establishment.

If OCS 140 grants a quota, then CTF 210 will receive a charging response from OCS 140 indicating the quota of service units granted to SMF element 116 by the OCS 140 (step 308). CTF 210 centrally manages the quota among multiple UPF elements 124 involved in the session by evaluating credit needs among UPF elements 124, and distributing the quota among UPF elements 124 in the form of slices. CTF 210 may distribute the entirety of the quota to UPF elements 124, or may reserve a share of the quota granted by OCS 140. CTF 210 may re-distribute the reserved share in the middle of the session as needed.

To manage the quota, CTF 210 allocates a slice of the quota to each of the UPF elements 124 provisioned for the session (step 310), assuming that the quota balance is sufficient. CTF 210 may receive a message from UPF elements 124 requesting authorization to perform a function or otherwise serve the session, which triggers CTF 210 to allocate the slices to the UPF elements 124. CTF 210 may evaluate the credit needs for each UPF element 124 based on the policy rules received from PCF element 118, service type, SDF, QoS, expected packets and time, etc., and allocate the slices accordingly. CTF 210 may also allocate slices based on history of quota consumption by a UPF element 124. A network operator may set up a history rules/experience in SMF element 116 to assist with this evaluation and estimation. Initially, slice allocation may be based on heuristics (e.g., different UPF elements 124 may have different "rates of spending" as predicated by the QoS provided within those UPF elements, thereby influencing the quota distribution strategy at SMF element 116). Over time, slice allocation may be gradually refined via a feedback loop at SMF element 116.

CTF 210 transmits messages to UPF elements 124 (through interface component 203) indicating the slices of the quota granted to UPF elements 124 (step 312). In other words, CTF 210 sends a message to each UPF element 124 provisioned for the session indicating the slice for that element. The message may indicate the slice for that UPF element 124 only. A UPF element 124 interprets receipt of a slice from SMF element 116 as authorization to serve the session and perform budget control to decrement from the slice according to resource usage. CTF 210 also manages the quota by decrementing the slices granted to UPF elements 124 from the quota so that a running balance of the quota is monitored.

As shown in FIG. 4, CTF 210 in SMF element 116 may transmit a message to the UPF-A indicating slice-A of the quota that is allocated to UPF-A 124. CTF 210 in SMF element 116 may transmit a message to the UPF-B indicating slice-B of the quota that is allocated to UPF-B 124. Similar messaging may occur for a number of UPF elements 124 until a modification event is detected (step 318 in FIG. 3). For example, the modification event may be the end of the session, the quota becomes depleted, the session is modified, UPF elements 124 are added or dropped from the session or hand over from one UPF element to another (e.g., mobility), UPF elements 124 use up their slice, etc. When encountering a modification event, SMF element 116 is configured to intelligently re-evaluate credit needs among UPF elements 124, rebalance the remaining quota, and redistribute the remaining quota to the remaining UPF elements 124 with or without reporting to PCF element 118 and/or OCS 140.

CTF 210 may also report charging information to the OCS 140 indicating the slices allocated to the UPF elements 124 (step 314). For example, CTF 210 may transmit a charging request to OCS 140 indicating the slice allocated to each of the UPF elements 124.

As is evident in the above embodiment, SMF element 116 manages a quota on behalf of UPF elements 124. One technical benefit is that UPF elements 124 do not need to implement their own independent CTFs to interact with OCS 140. Another technical benefit is that OCS 140 only has to interact with SMF element 116 during a session, and is not bombarded with messages from multiple UPF elements 124 during the session.

As CTF 210 grants slices to UPF elements 124 and monitors the volume or balance of the quota, CTF 210 may determine that the quota is consumed during the session (step 316). In response to determining that the quota is consumed, CTF 210 may transmit another charging request to OCS 140 requesting a new quota of service units for SMF element 116 (step 306), and receive another charging response from OCS 140 indicating the new quota of service units granted to SMF element 116 by OCS 140 (step 308). This may happen when quota redistribution or rebalancing may not suffice to provide sufficient coverage for a session. In another embodiment, CTF 210 may end the session or may allow for over-charging with an online threshold level. Over-charging thresholds may be set at different levels. UPF element 124 and the end user may be notified for over-charging (e.g., SMS or other form of communication to the end user). The end user may choose to reject over-charging, in which CTF 210 will terminate the session. If the end user indicates a separate charging account to continue the session, CTF 210 will end the current charging session and start a new charging session to the new charging account. In another embodiment, PCF element 118 and OCS 140 may direct CTF 210 to switch from online charging mode to offline charging mode when the quota is consumed.

Figure 5:
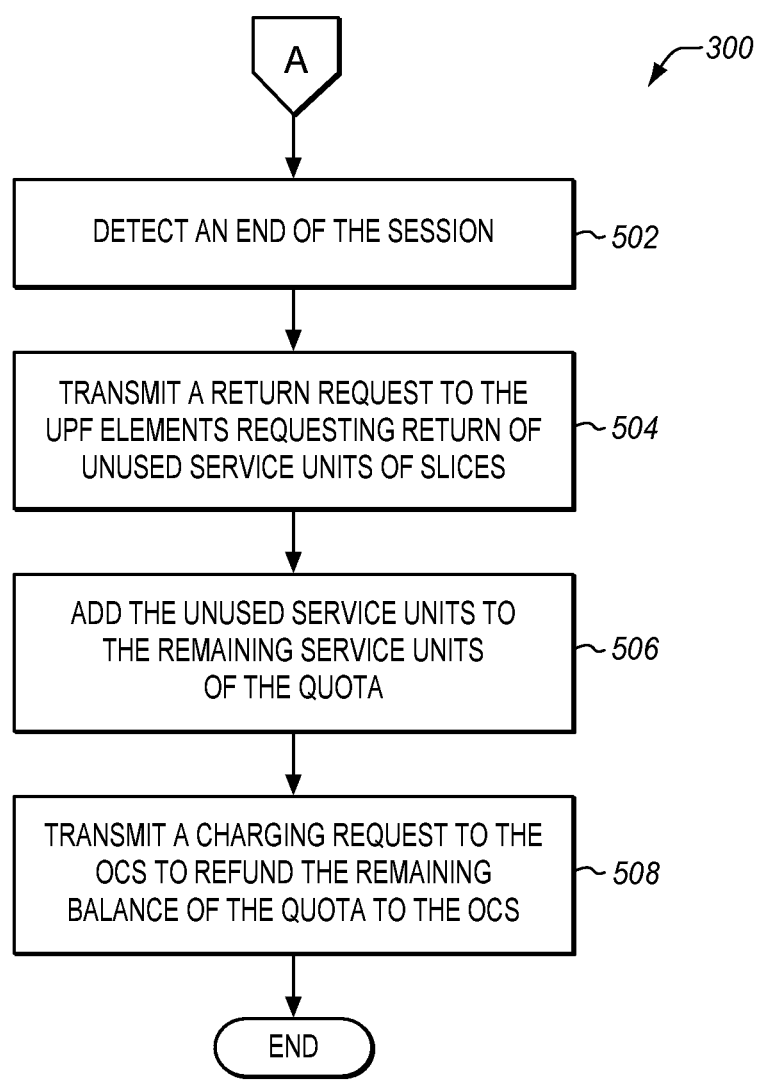
FIG. 5 is a flow chart illustrating additional steps of the method of FIG. 3 responsive to an end of the session in an illustrative embodiment.

The slices allocated above are used for online charging until a modification event is detected by CTF 210 (step 318). In one embodiment, a modification event may be an end to the session. FIG. 5 is a flow chart illustrating additional steps of method 300 responsive to an end of the session in an illustrative embodiment. CTF 210 detects an end of the session (step 502). For example, CTF 210 may receive a message from a UPF element 124 or another element indicating that the session has ended. CTF 210 transmits a return request to the UPF elements 124 (which were previously allocated slices of the quota) requesting return of unused service units of the slices (step 504). CTF 210 adds the unused service units to the remaining service units or remaining balance of the quota (step 506). CTF 210 then transmits a charging request to OCS 140 to refund the remaining balance of the quota to OCS 140 (step 508).

Figure 6:
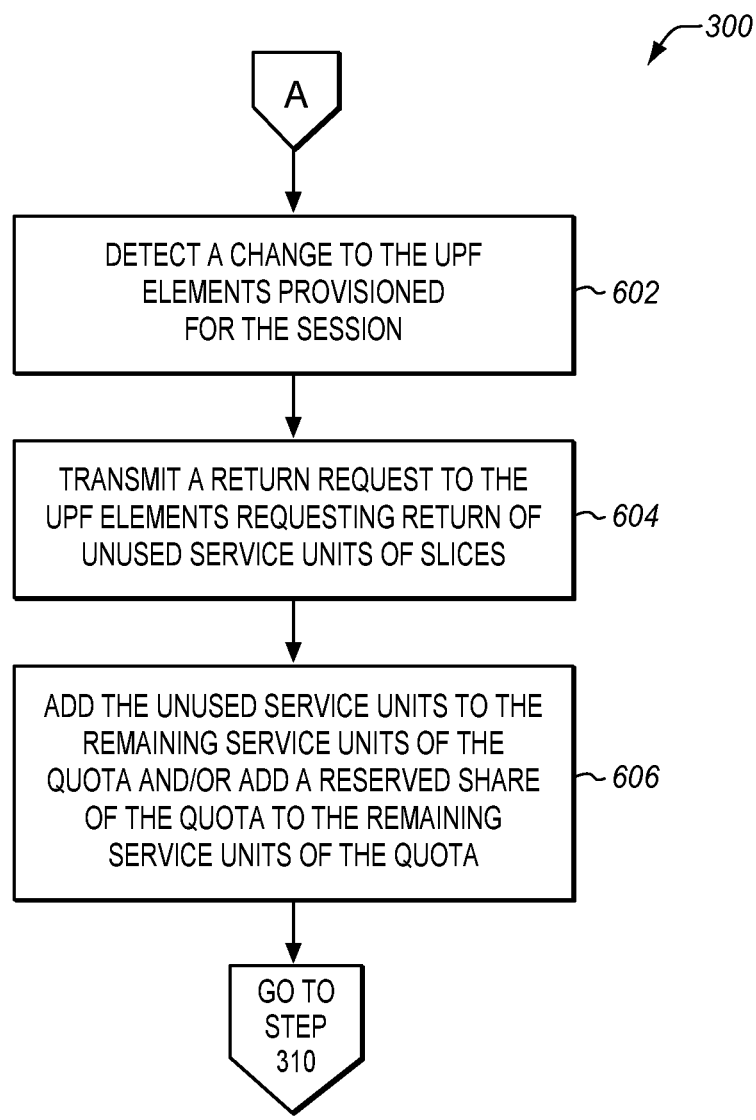
FIG. 6 is a flow chart illustrating additional steps of the method of FIG. 3 responsive to a change to UPF elements in an illustrative embodiment.

Other modification events may occur during a session, and CTF 210 may respond to such modification events by redistributing the quota (or remaining portion thereof) to the UPF elements 124 serving the session. In redistributing the quota, CTF 210 may request that each UPF element 124 returns unused portions of previously-allocated slices, and reallocate the remaining balance of the quota to the UPF elements 124 based on present conditions. For instance, a modification event may be a change to the UPF elements 124 provisioned for the session. FIG. 6 is a flow chart illustrating additional steps of method 300 responsive to a change to the UPF elements 124 in an illustrative embodiment. CTF 210 detects a change to the UPF elements 124 provisioned for the session (step 602). A change to the UPF elements 124 may comprise addition of a UPF element 124 during the session, removal of a UPF element 124 during the session, handover from one UPF element 124 to another during the session, etc. For example, due to the mobility of UE 132, UPF elements 124 may change during a session. A set of UPF elements 124 may be initially provisioned for the session by SMF element 116 when the session is established, and CTF 210 may grant slices to each UPF element 124 in the set. If a UPF element 124 is added or removed from the set, then CTF 210 is able to detect the change. CTF 210 transmits a return request to the UPF elements 124 (which were previously allocated slices of the quota) requesting return of unused service units of the slices (step 604). CTF 210 adds the unused service units to the remaining service units or remaining balance of the quota (step 606). If CTF 210 previously reserved a share of the quota granted by OCS 140, then it may also add the reserved share to the remaining balance of the quota. CTF 210 then redistributes the remaining balance of the quota to UPF elements 124, as indicated by returning to step 310 in FIG. 3.

Figure 7:
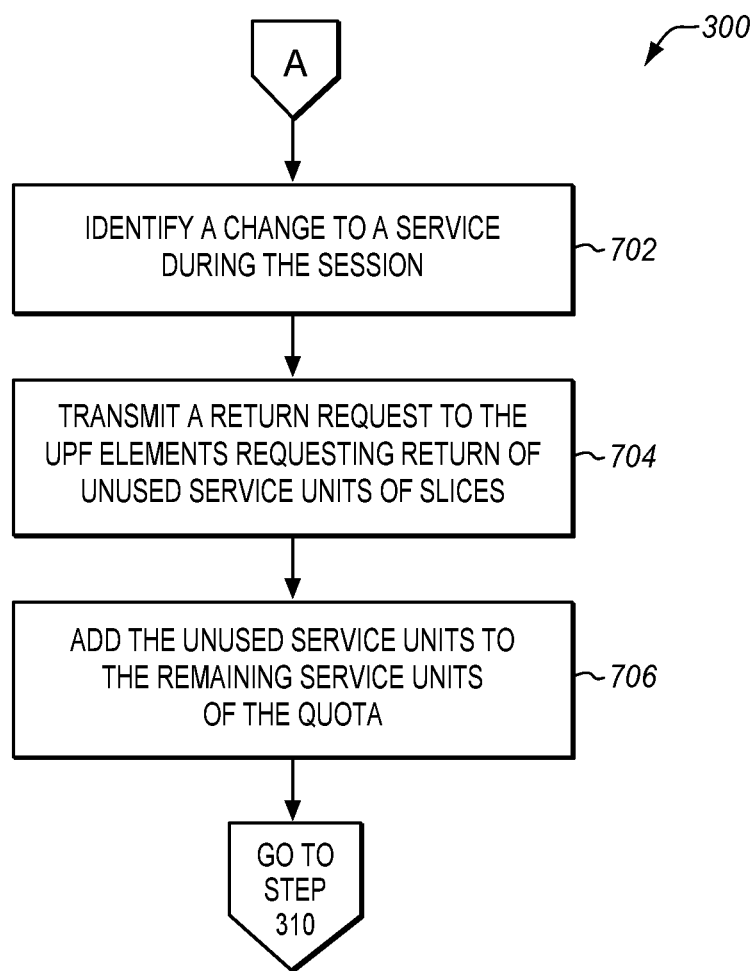
FIG. 7 is a flow chart illustrating additional steps of the method of FIG. 3 responsive to a change to a service in an illustrative embodiment.

In another embodiment, a modification event may be a change to one or more services during the session. FIG. 7 is a flow chart illustrating additional steps of method 300 responsive to a change to a service in an illustrative embodiment. CTF 210 identifies the change to a service during the session (step 702). For example, CTF 210 may receive an update message from a UPF element 124 indicating a change to a service description, access type, QoS, etc., during a session. CTF 210 transmits a return request to the UPF element 124 requesting return of unused service units of the slices (step 704). CTF 210 adds the unused service units of the slice to the remaining service units in the quota (step 706). If CTF 210 previously reserved a share of the quota granted by OCS 140, then it may also add the reserved share to the remaining balance of the quota. CTF 210 then redistributes the remaining balance of the quota to UPF elements 124 based on the change to the service, as indicated by returning to step 310 in FIG. 3. In redistributing the quota, CTF 210 may acquire new policy rules for UE 132 from PCF element 118. CTF 210 may therefore transmit a policy request to PCF element 118 (through interface component 204) requesting policy rules for the session involving UE 132 in light of the service change. CTF 210 is able to modify quota consumption without requesting a new quota from OCS 140. When a service changes in this manner, CTF 210 may request that each UPF element 124 return a remaining portion of their slice, and redistribute the remaining balance of the quota to UPF elements 124.

Figure 8:
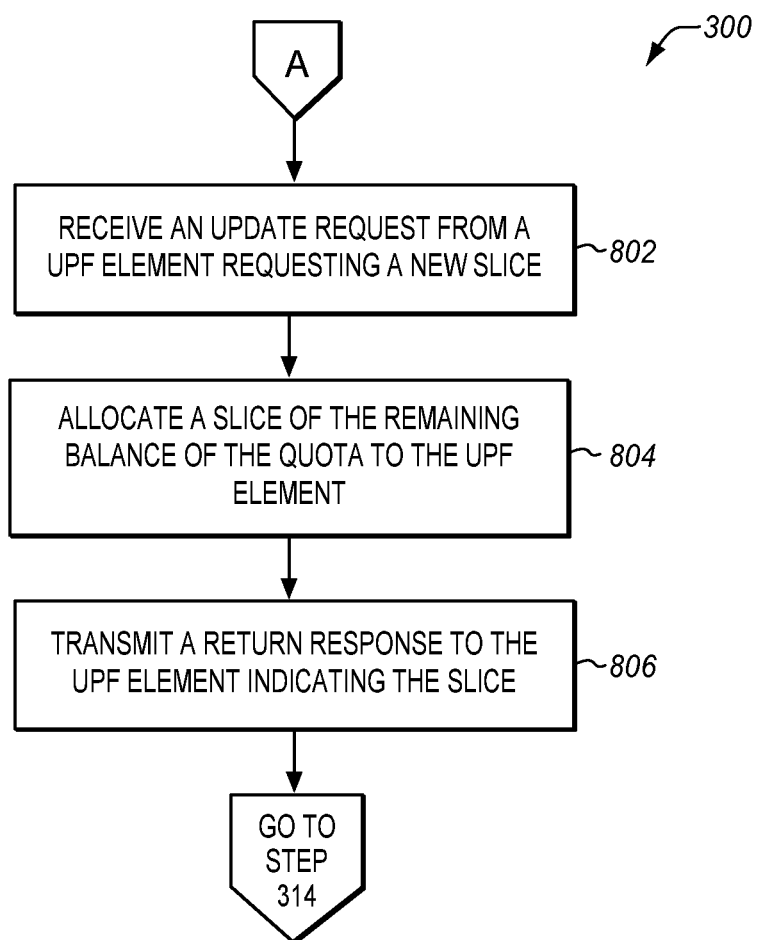
FIG. 8 is a flow chart illustrating additional steps of the method of FIG. 3 responsive to a request for a new slice by a UPF element in an illustrative embodiment.

In another embodiment, a modification event may be a request for a new slice by a UPF element 124. FIG. 8 is a flow chart illustrating additional steps of method 300 responsive to a request for a new slice by a UPF element 124 in an illustrative embodiment. CTF 210 receives an update request from a UPF element 124 requesting a new slice (step 802). A UPF element 124 performs budget control by decrementing a balance of the slice in accordance with resource usage. When or before its slice is depleted, the UPF element 124 may send an update request to CTF 210 requesting a new slice. In response to the update request, CTF 210 allocates another slice of the quota (i.e., from the remaining service units) to the UPF element 124 (step 804). CTF 210 then transmits a return response to the UPF element 124 indicating the new slice (step 806). Method 300 then returns to step 314 in FIG. 3. When a UPF element 124 requests a new slice, CTF 210 may request that each UPF element 124 return a remaining portion of their slice, and redistribute the remaining balance of the quota to the UPF elements 124 instead of just allocating another slice to the UPF element 124 that requested the new slice.

UPF elements 124 may periodically send update messages to SMF element 116 indicating resource usage, slice information, etc. CTF 210 may report charging information to OCS 140 in response to receiving the update messages from UPF elements 124. PCF element 118 may instruct CTF 210, via the policy rules, whether and when to send interim reports to OCS 140 with the charging information.

There may be a scenario where OCS 140 grants a quota per UPF 124 instead of granting a single quota to SCF element 116. In such a scenario, SMF element 116 may pass a granted quota to a UPF element 124 with or without modification. SMF element 116 may process the policy rules from PCF element 118 or locally-provisioned rules at SMF element 116 to determine whether or not to modify a quota granted to a UPF element 124 by OCS 140.

In one embodiment, MEC may be implemented in a (R)AN of a next generation network. MEC is an edge computing technology that enables the deployment of services (e.g., IT services and cloud services) within the (R)AN to more effectively provide latency-sensitive services and improve user experience. MEC may also be referred to as Mini Cloud, Cloudlet, Mobile Edge Cloud, Multi-access Edge Computing, or Fog Computing. To implement MEC, compute capabilities are implemented at one or more base stations or other functionalities of the RAN so that services are deployed closer to the UEs, which is further described below.

Figure 9:
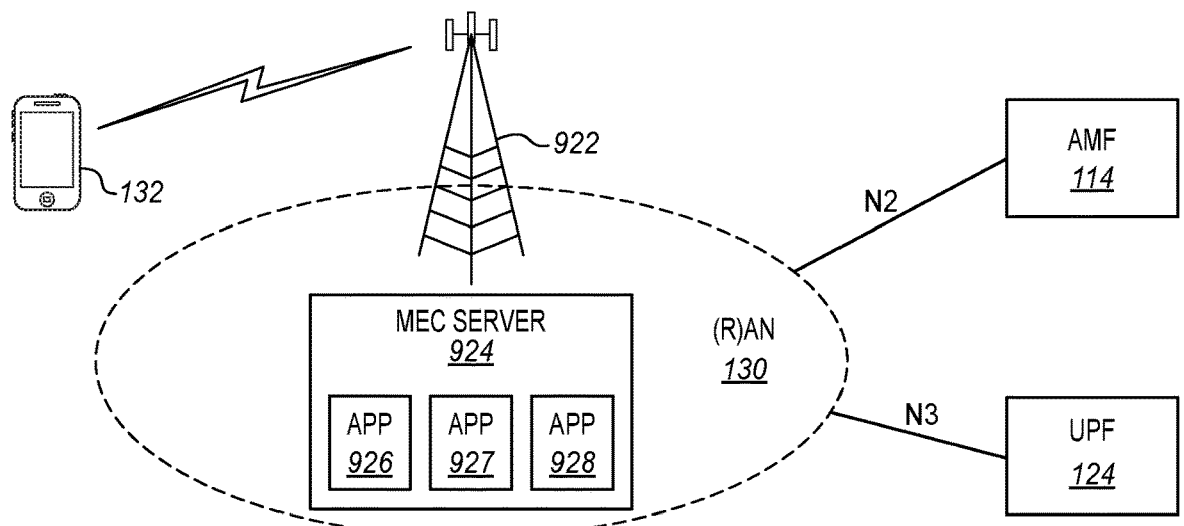
FIG. 9 illustrates a (R)AN of a next generation network in an illustrative embodiment.

FIG. 9 illustrates (R)AN 130 of a next generation network in an illustrative embodiment. (R)AN 130 is a network that implements a radio access technology to connect mobile devices to a core network. (R)AN 130 may support Evolved-UMTS Terrestrial Radio Access Network (E-UTRAN) access, Wireless Local Area Network (WLAN) access, fixed access, satellite radio access, new Radio Access Technologies (RAT), etc. In this embodiment, (R)AN 130 includes one or more base stations 922. A base station 922 is an access network element/node in (R)AN 130 that handles radio communications with mobile devices using antennas typically mounted on a tower. One example of (R)AN 130 is an E-UTRAN having one or more Evolved-NodeBs (eNodeB) (i.e., base stations). Base station 922 has a service area that is referred to as a cell. UE 132 and other mobile devices that are located within the cell are able to communicate with base station 922 over the air interface, which is the communication link between a mobile device and a base station. UE 132 is able to attach to (R)AN 130 and access services. UE 132 is a device used directly by an end user, such as a phone, a tablet, a computer with a mobile broadband adapter, etc. Base station 922 may communicate with AMF element 114 via the N2 reference point, and may communicate with one or more UPF elements 124 via the N3 reference point.

In this embodiment, MEC is implemented in (R)AN 130. For instance, a MEC server 924 is implemented at base station 922 of (R)AN 130, and is configured to provide MEC services to mobile devices (e.g., UE 132) in range of base station 922. When referred to as being implemented "at" base station 922, MEC server 924 may be part of base station 922 (i.e., part of the controller of base station 922) or may be an external server deployed between base station 922 and the core network. MEC server 924 may alternatively be implemented at a WiFi server of (R)AN 130 or another wireless server.

MEC server 924 hosts, executes, or runs one or more edge applications (APP) 926-928. An edge application is an application that provides a MEC service to one or more mobile devices in range of base station 922 as opposed to the core network providing the MEC service, such as through a UPF element 124. MEC server 924 may dynamically deploy or provision edge applications 926-928 based on business needs to serve UE 132. Thus, UE 132 may be in communication with one or more of edge applications 926-928 in MEC server 924 when receiving MEC services, and the services do not have to be provided by a network element within the core network. This allows for MEC services to be provided with lower latency as they are provided by (R)AN 130 as opposed to the core network.

Communications between UE 132 and MEC server 924 may be divided into control plane transmissions and user plane transmissions. As described above, the control plane is a network plane that carries signaling traffic, and the user plane (also referred to as the data plane, forwarding plane, or bearer plane) is the network plane that carries user data traffic, such as voice and data traffic. User data traffic (downlink (DL) and/or uplink (UL)) is carried on data radio bearers (DRB) of the user plane between base station 922 and UE 132. A DRB is a virtual connection between two endpoints for transporting traffic based on a set of attributes over the air interface.

As an overview of the embodiments described herein, UE 132 attaches to (R)AN 130 and registers with the core network (e.g., AMF element 114). A session may be established between UE 132 and the core network, such as a PDU session. The session may be initiated by UE 132, or a network may initiate the session via a device trigger message. An example of session establishment procedures in next generation networks may be found in 3GPP TS 23.502 (v1.3.0), which is incorporated by reference as if fully included herein. Within a session, UE 132 may initiate service request procedures to request a MEC service, such as to send uplink data. A service request procedure for next generation networks is used to activate/establish a user plane connection for a session. When MEC is implemented as in the present embodiment, the user plane connection for a MEC service is between UE 132 and an edge application 926-928 of MEC server 924 instead of between UE 132 and a UPF element 124 of a core network. MEC server 924 may also initiate service request procedures to request a MEC service, such as to send DL data to UE 132. Either way, a user plane connection is established between UE 132 and an edge application 926-928 in response to a service request procedure. And, multiple service request procedures may be performed during a session to establish multiple user plane connections between UE 132 and one or more edge applications 926-928 in MEC server 924.

In the embodiments described herein, MEC server 924 is enhanced to manage a quota of service units for edge applications 926-928 that provide MEC services for a session of UE 132. Mobile edge quota management is a new charging model for next generation networks. MEC server 924 interacts with SMF element 116 (through AMF element 114) to obtain a quota of service units for a session. As described above, SMF element 116 includes CTF 210 that interacts with OCS 140 to obtain a quota of service units for a session from OCS 140. Instead of managing the quota at SMF element 116, CTF 210 in SMF element 116 forwards the quota to MEC server 924 for quota management, including parallel and handover credit pooling management among multiple edge applications 926-928. MEC server 924 performs quota management by distributing slices of the quota to the edge applications 926-928 that provide MEC services for the session. Thus, edge applications 926-928 do not interact directly with OCS 140 to obtain their own slice or quota. MEC server 924 interacts with SMF element 116 in place of edge applications 926-928 to obtain a quota for a session, and then distributes slices of the quota to edge applications 926-928 based on policy rules, access type, service type, QoS, etc.

Figure 10:
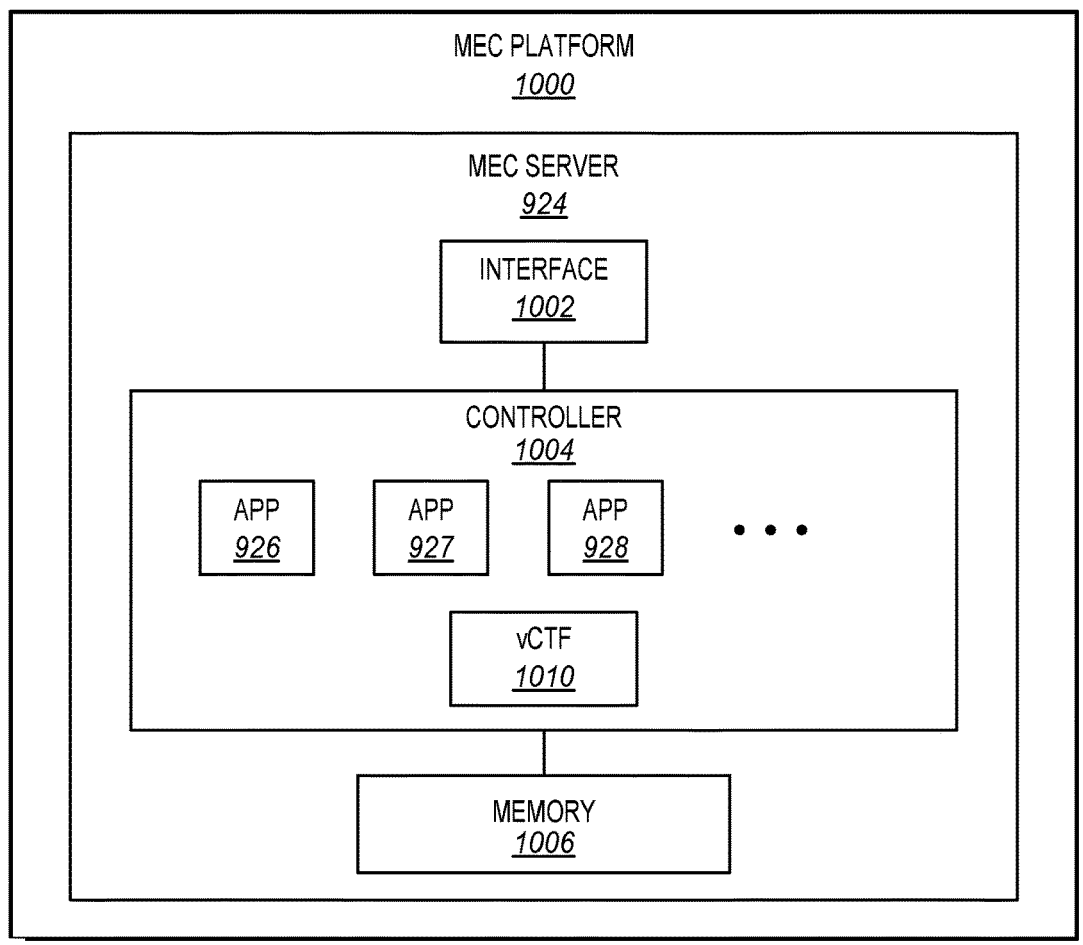
FIG. 10 is a block diagram of a MEC server in an illustrative embodiment.

FIG. 10 is a block diagram of MEC server 924 in an illustrative embodiment. MEC server 924 is implemented on a MEC platform 1000. MEC platform 1000 refers to a pool of physical resources in (R)AN 130 that are used to implement MEC server 924 and possibly other MEC servers within (R)AN 130. MEC platform 1000 may include the physical resources of compute resources, storage resources, and network resources.

In this embodiment, MEC server 924 is an apparatus that includes an interface component 1002, a controller 1004, and a memory 1006. Interface component 1002 may comprise circuitry, logic, hardware, means, etc., configured to communicate with base station 922 (and other base stations of (R)AN 130) and the core network (e.g., AMF element 114). Interface component 1002 may be able to interpret a variety of protocols. Controller 1004 may comprise circuitry, logic, hardware, means, etc., that provides the functions of MEC server 924 through one or more processors or other physical resources. Controller 1004 is able to communicate with base station 922 and the core network through interface component 1002. Memory 1006 is a local computer readable storage medium or means for storing data, instructions, applications, etc., and is accessible by controller 1004. MEC server 924 may include various other components not specifically illustrated in FIG. 10.

Controller 1004 implements edge applications 926-928 as well as other edge applications not shown. Edge applications 926-928 are configured to provide MEC services to one or more UEs. Some examples of MEC services provided by edge applications 926-928 include smart building services, IoT services, Vehicle-to-Infrastructure (V2I) services, AR services, video services, etc. Controller 1004 is configured to dynamically deploy or provision edge applications 926-928 for a session to provide MEC services for the session. Edge applications 926-928 may also be referred to virtual network elements (vNE).

Controller 1004 also implements a virtual CTF (vCTF) 1010. Virtual CTF 1010 is referred to as "virtual" because it does not interact directly with the charging domain (i.e., OCS 140) to obtain a quota. Virtual CTF 1010 is configured to interact with SMF element 116 to obtain a quota for the session. Virtual CTF 1010 is configured to manage the quota on behalf of edge applications 926-928 that provide MEC services for the session. Virtual CTF 1010 is configured to delay the actual resource usage until permission by SMF element 116 has been granted, to track the availability of resource usage permission (i.e., quota management) during the network resource usage, and enforce termination of network resource usage when permission by SMF element 116 is not granted or expires. A further description of quota management is described below.

Figure 11:
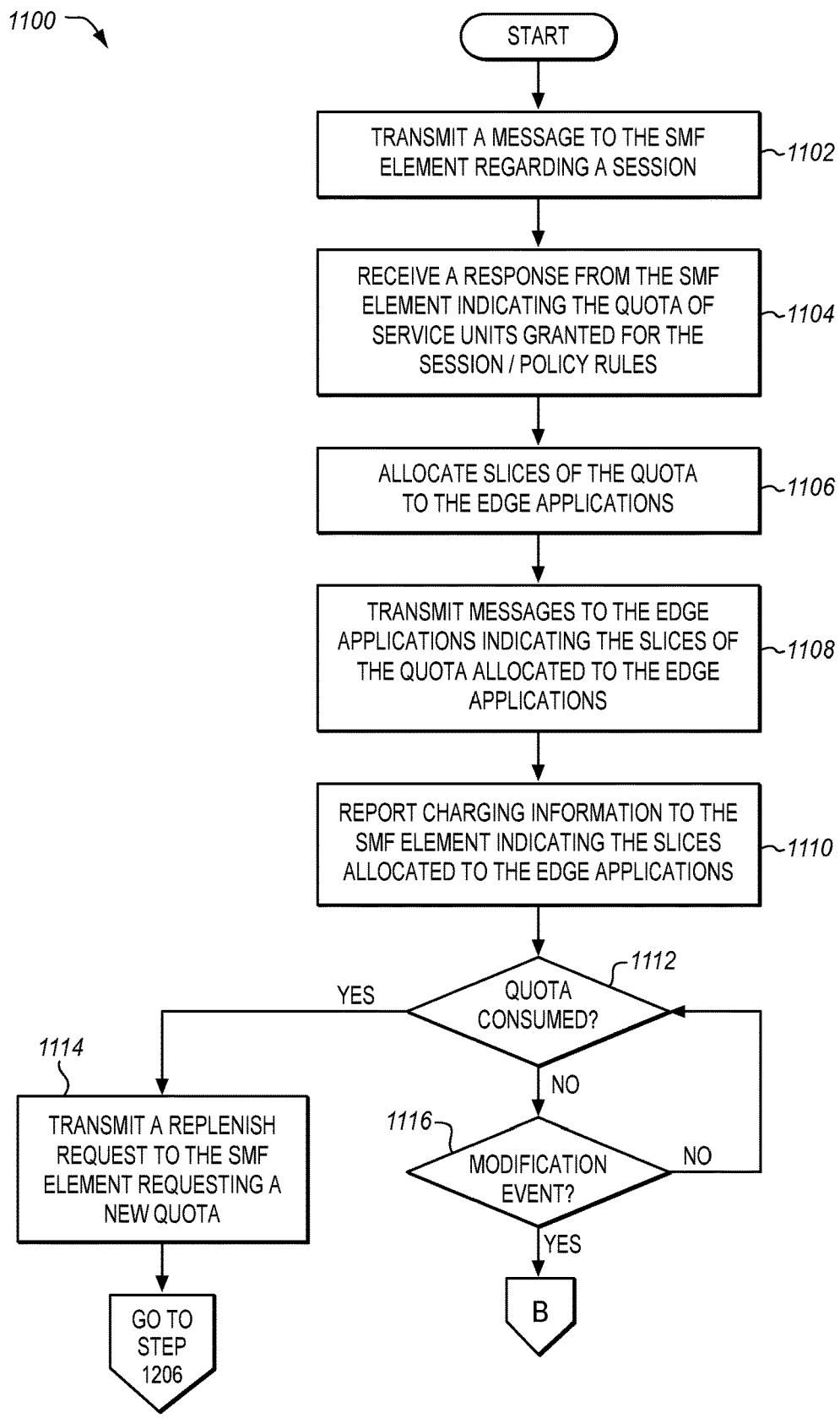
FIGS. 11-12 are flow charts illustrating a method of performing quota management in a MEC server in an illustrative embodiment.
Figure 12:
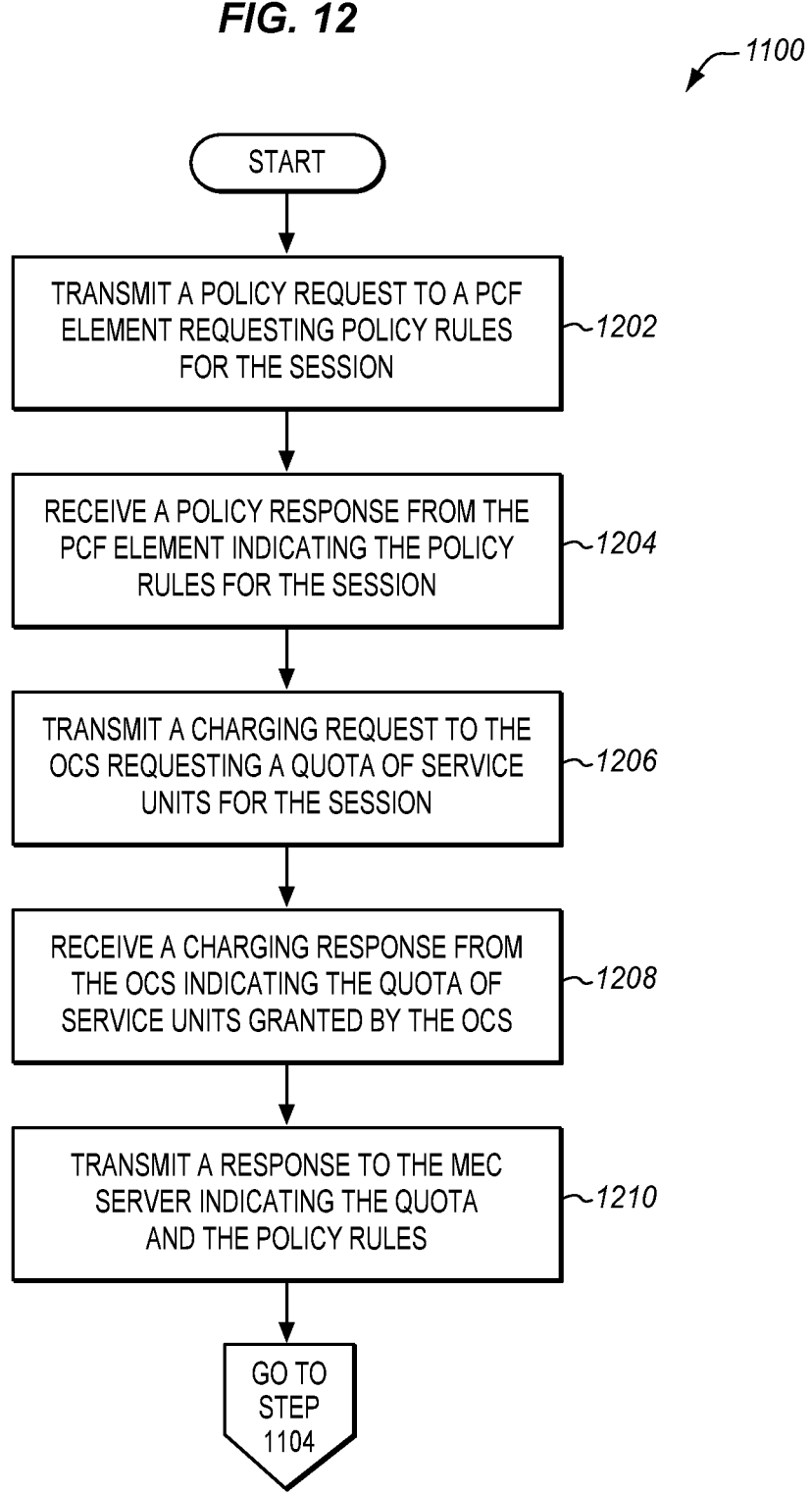

FIGS. 11-12 are flow charts illustrating a method 1100 of performing quota management in MEC server 924 in an illustrative embodiment. The steps of method 1100 shown in FIG. 11 are performed in MEC server 924 as shown in FIG. 10. The steps of method 1100 shown in FIG. 12 are performed in SMF element 116 as shown in FIGS. 1-2. However, those skilled in the art will appreciate that method 1100 may be performed in other devices/architectures.

One assumption for method 1100 in FIG. 11 is that a session (e.g., a PDU session) is being established or has been established for UE 132. Controller 1004 of MEC server 924 may provision multiple edge applications 926-928 to provide MEC services for the session. Virtual CTF 1010 of MEC server 924 may estimate credit needs for the session in consideration of the edge applications 926-928 provisioned for the session. Virtual CTF 1010 may then transmit a session establishment message or another type of message to SMF element 116 through AMF element 114 (step 1102). The message may include a quota request (e.g., for the estimated quota determined by virtual CTF 1010), service characteristics of the MEC services, session information, etc.

In FIG. 12, CTF 210/SMF element 116 may acquire policy rules for UE 132 from PCF element 118, such as in response to receiving the message from virtual CTF 1010. CTF 210 may therefore transmit a policy request to PCF element 118 (through interface component 204) requesting policy rules (e.g., PCC rules) for the session involving UE 132 (step 1202). CTF 210 may include a variety of information regarding the session in the policy request to PCF element 118, such as information regarding PCF element 118, information regarding edge applications 926-928 provisioned for the session, QoS information, MEC service information, etc. In response to the policy request, PCF element 118 may make a policy decision for the session involving UE 132, and generate or formulate the policy rules. CTF 210 may then receive a policy response from PCF element 118 indicating the policy rules for the session (step 1204). CTF 210 stores the policy rules in a local memory.

CTF 210 also acquires the quota from OCS 140 for the session. To do so, CTF 210 transmits a charging request to OCS 140 (through interface component 202) requesting a quota of service units for the session (step 1206). The quota requested may correspond with the estimated credit needs determined by virtual CTF 1010 of MEC server 924. When the account balance of the end user is sufficient, OCS 140 may grant a quota or allotment of service units from the account balance of the end user for the session. The quota comprises any portion of the account balance that OCS 140 grants for the session. If OCS 140 does not grant a quota, then CTF 210 will receive a charging response from the OCS 140 (through interface component 202) indicating that the session is not allowed (i.e., including a cause code). CTF 210 will therefore terminate the session or block session establishment (e.g., send a message to virtual CTF 1010).

If OCS 140 grants a quota, then CTF 210 will receive a charging response from OCS 140 indicating the quota of service units granted for the session by the OCS 140 (step 1208). CTF 210 then transmits a session establishment response or another type of response to MEC server 924 indicating the quota granted for the session, the policy rules defined for the session, and possibly other information (step 1210). The granted quota is a lump sum to MEC server 924 for the session. The policy rules may include an edge application list for sharing the quota and the percentage that the quota can be distributed among these edge applications 926-928. If no distribution percentage is provided, then the quota may be shared among the edge applications 926-928 until the quota is exhausted. The edge application list and distribution percentage may be condition-dependent. For example, based on the change of appointed criteria (e.g., time, UE location, etc.), the edge application list and distribution percentage may be changed dynamically. The policy rules may include an assigned priority for each edge application running on MEC server 924, which may be used by virtual CTF 1010 to determine the quota distribution. For example, the higher priority edge application will get a larger slice. If a new edge application 926-928 is instantiated on MEC server 924 and provisioned for the session, then its priority may be used to determine what slice may be allocated. The policy rules may include a quota holding time and expected action(s) when the timer expires. For example, the policy rules may specify that virtual CTF 1010 reports when the timer has expired, returns the quota to SMF element 116, requests a new quota, etc. The policy rules may include a quota threshold and expected action(s) when the quota threshold is met. For example, the policy rules may specify that virtual CTF 1010 reports when the quota threshold is reached, modify edge applications 926-928 or change QoS Flow ID (QFI) to lower tariff rate, shrink the edge application list that share the quota to make the remaining quota available for a more limited set of edge applications, request new quota, etc. The policy rules may include criteria for quota usage reporting. The criteria may specify that virtual CTF 1010 reports periodically or based on some predefined event such as the quota being exhausted, an edge application 926-928 is added/removed, etc. The criteria may specify the information to be reported by virtual CTF 1010, such as application ID, packet consumption, quota consumption time, quota holding time, quota threshold, tariff time change, etc. The policy rules may also include instructions for the quota handling after the session ends, such as reserve the remaining quota for the next session, or return it directly to SMF element 116.

In FIG. 11, virtual CTF 1010 in MEC server 924 receives a response from SMF element 116 (through interface component 1002) indicating the quota granted for the session, the policy rules defined for the session, and any other relevant information (step 1104). Virtual CTF 1010 centrally manages the quota among the edge applications 926-928 dynamically provisioned for the session by evaluating credit needs among the edge applications 926-928, and distributing the quota among the edge applications 926-928 in the form of slices. Virtual CTF 1010 may distribute the entirety of the quota to the edge applications 926-928, or may reserve a share of the quota. Virtual CTF 1010 may redistribute the reserved share in the middle of the session as needed.

To manage the quota, virtual CTF 1010 allocates a slice of the quota to each of the edge applications 926-928 providing a MEC service for the session (step 1106), assuming that the quota balance is sufficient. Virtual CTF 1010 may receive a message from the edge applications 926-928 requesting authorization to provide MEC services for the session, which triggers virtual CTF 1010 to allocate the slices to the edge applications 926-928. Virtual CTF 1010 may evaluate the credit needs for each of the edge applications 926-928 based on the policy rules received from SMF element 116, service type, application type, QoS, etc., and allocate the slices accordingly. Virtual CTF 1010 may also allocate slices based on a history of quota consumption by edge applications 926-928. Virtual CTF 1010 may intelligently refine the policy rules for quota management during the session or after the session.

Virtual CTF 1010 transmits messages to edge applications 926-928 indicating the slices of the quota allocated to edge applications 926-928 (step 1108). In other words, virtual CTF 1010 sends a message to each edge application 926-928 providing a MEC service for the session indicating the slice for that edge application 926-928. The message may indicate the slice for that edge application 926-928 only. An edge application 926-928 interprets receipt of a slice from virtual CTF 1010 as authorization to provide the MEC service, which may cause the edge application 926-928 to initiate the MEC service and perform budget control to decrement from the slice according to resource usage while providing the MEC service. Virtual CTF 1010 also manages the quota by decrementing the slices granted to edge applications 926-928 from the quota so that a running balance of the quota is monitored. Virtual CTF 1010 may also monitor slice consumption among edge application 926-928. For instance, virtual CTF 1010 may collect packet detection information, measurement threshold, and usage information for edge applications 926-928 within MEC server 924.

Virtual CTF 1010 may also report charging information to SMF element 116 indicating the slices allocated to the edge applications 926-928 (step 1110). For example, virtual CTF 1010 may transmit an update message to SMF element 116 (through AMF element 114) indicating the slice allocated to each of the edge applications 926-928. As is evident in the above embodiment, virtual CTF 1010 manages a quota on behalf of edge applications 926-928. One technical benefit is that edge applications 926-928 do not need to implement their own independent CTFs to interact with OCS 140 or SMF element 116. Another technical benefit is that SMF element 116 only has to interact with MEC server 924 during a session, and is not bombarded with messages from multiple edge applications 926-928 that provide MEC services during the session.

As virtual CTF 1010 grants slices to edge applications 926-928 and monitors the volume or balance of the quota, virtual CTF 1010 may determine that the quota is consumed during the session (step 1112). In response to determining that the quota is consumed, virtual CTF 1010 may transmit a replenish request to SMF element 116 requesting a new quota of service units for the session (step 1114). Method 1100 may return to step 1206 in FIG. 12, where SMF element 116 transmits a charging request to OCS 140 requesting a new quota for the session. In another embodiment, virtual CTF 1010 may end the session or may allow for over-charging with an online threshold level as described above. In another embodiment, virtual CTF 1010 may switch from online charging mode to offline charging mode when the quota is consumed. In another embodiment, when the quota is near to a threshold, virtual CTF 1010 may determine whether to modify the edge applications 926-928 or change QFI to a lower tariff rate.

Figure 13:
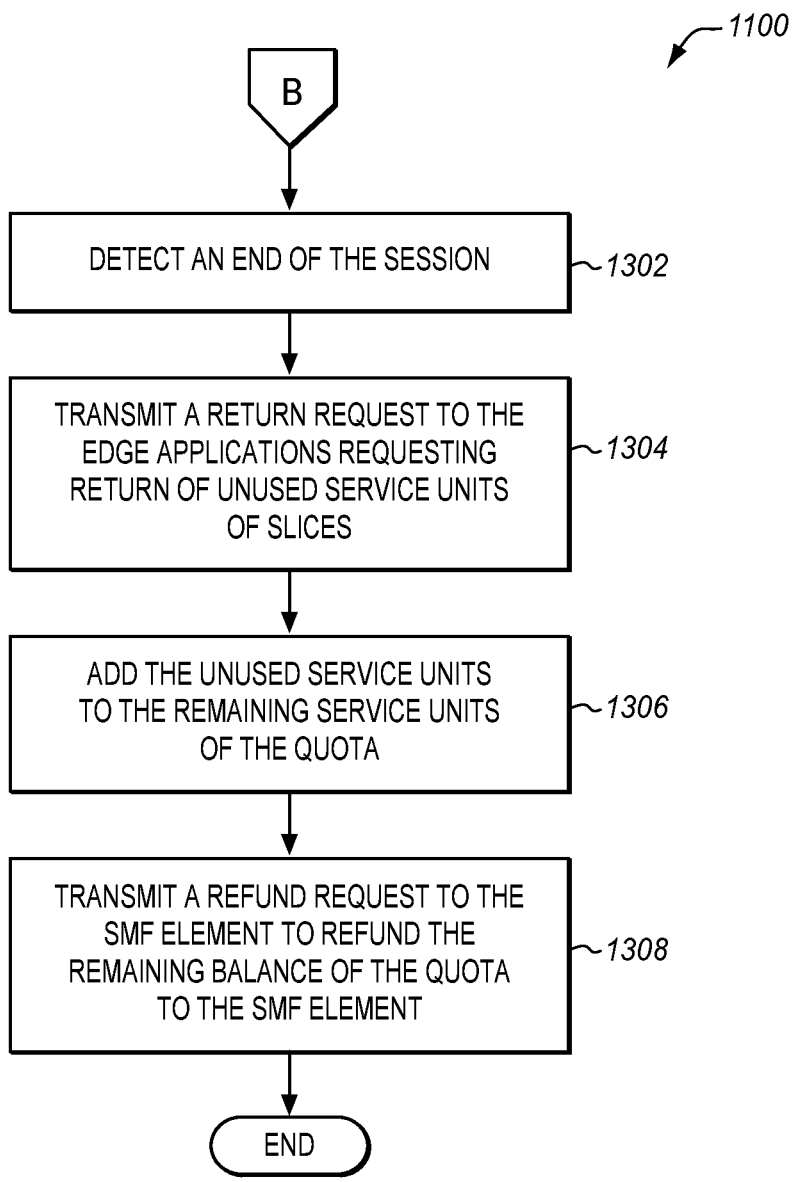
FIG. 13 is a flow chart illustrating additional steps of the method of FIG. 11 responsive to an end of the session in an illustrative embodiment.

The slices allocated above are used for online charging until a modification event is detected by virtual CTF 1010 (step 1116). In one embodiment, a modification event may be an end to the session. FIG. 13 is a flow chart illustrating additional steps of method 1100 responsive to an end of the session in an illustrative embodiment. Virtual CTF 1010 detects an end of the session (step 1302). For example, virtual CTF 1010 may receive a message from an edge application 926-928 or another element indicating that the session has ended. Virtual CTF 1010 transmits a return request to the edge applications 926-928 (which were previously allocated slices of the quota) requesting return of unused service units of the slices (step 1304). Virtual CTF 1010 adds the unused service units to the remaining service units or remaining balance of the quota (step 1306). Virtual CTF 1010 then transmits a refund request to SMF element 116 to refund the remaining balance of the quota to SMF element 116 (step 1308). Virtual CTF 1010 reports credit quota consumption per edge application 926-928 to SMF element 116 at the end of the session, and surrenders remaining credit to SMF element 116. The reported information per edge application 926-928 may comprise an application ID, packet consumption, quota consumption time, quota holding time, quota threshold, tariff time change, etc.

Figure 14:
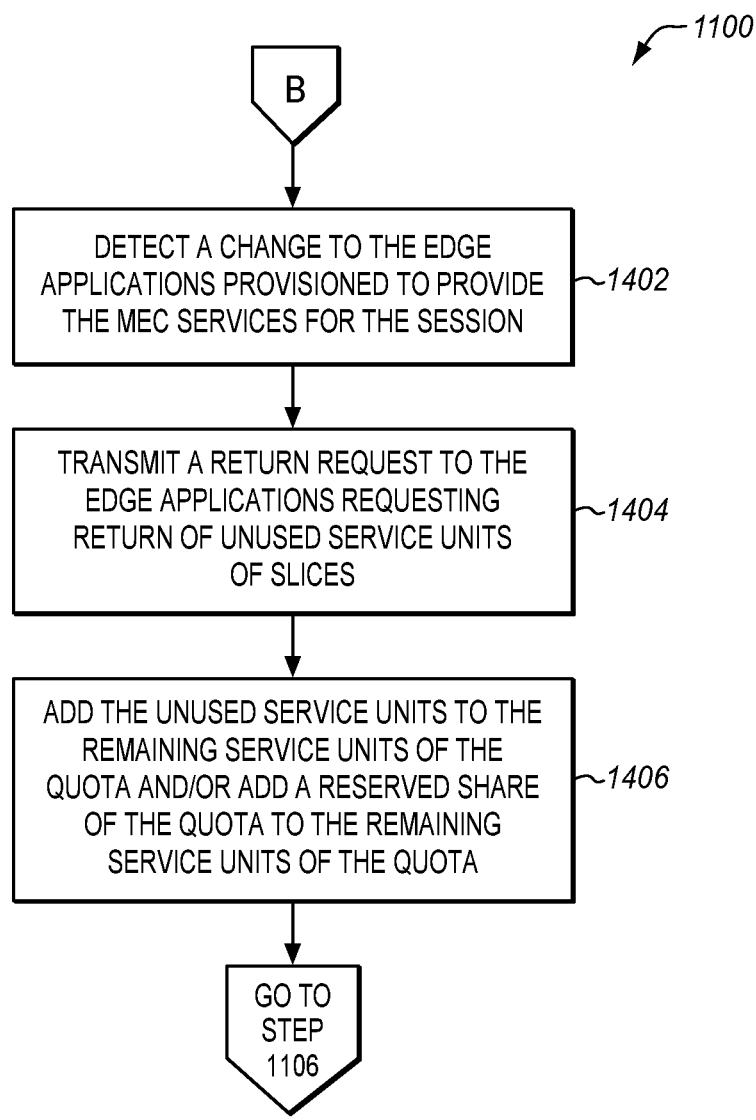
FIG. 14 is a flow chart illustrating additional steps of the method of FIG. 11 responsive to a change to edge applications in an illustrative embodiment.

Other modification events may occur during a session, and virtual CTF 1010 may respond to such modification events by redistributing the quota (or remaining portion thereof) to the edge applications 926-928 providing MEC services for the session. In redistributing the quota, virtual CTF 1010 may request that each edge application 926-928 returns unused portions of previously-allocated slices, and reallocate the remaining balance of the quota to the edge applications 926-928 based on present conditions. For instance, a modification event may be a change to the edge applications 926-928 that provide MEC services for the session. FIG. 14 is a flow chart illustrating additional steps of method 1100 responsive to a change to the edge applications 926-928 in an illustrative embodiment. Virtual CTF 1010 detects a change to the edge applications 926-928 provisioned to provide the MEC services for the session (step 1402). A change to the edge applications 926-928 may comprise addition of an edge application 926-928 during the session, removal of an edge application 926-928 during the session, handover of a MEC service from one edge application 926-928 to another during the session, etc. For example, due to the mobility of UE 132, edge applications 926-928 may change during a session. A set of edge applications 926-928 may be initially provisioned for the session by controller 1004 when the session is established, and virtual CTF 1010 may allocate slices to each edge application 926-928 in the set. If an edge application 926-928 is added or removed from the set, then virtual CTF 1010 is able to detect the change. Virtual CTF 1010 transmits a return request to the edge applications 926-928 (which were previously allocated slices of the quota) requesting return of unused service units of the slices (step 1404). Virtual CTF 1010 adds the unused service units to the remaining service units or remaining balance of the quota (step 1406). If virtual CTF 1010 previously reserved a share of the quota granted by SMF element 116, then it may also add the reserved share to the remaining balance of the quota. Virtual CTF 1010 then redistributes the remaining balance of the quota to edge applications 926-928, as indicated by returning to step 1106 in FIG. 11.

Figure 15:
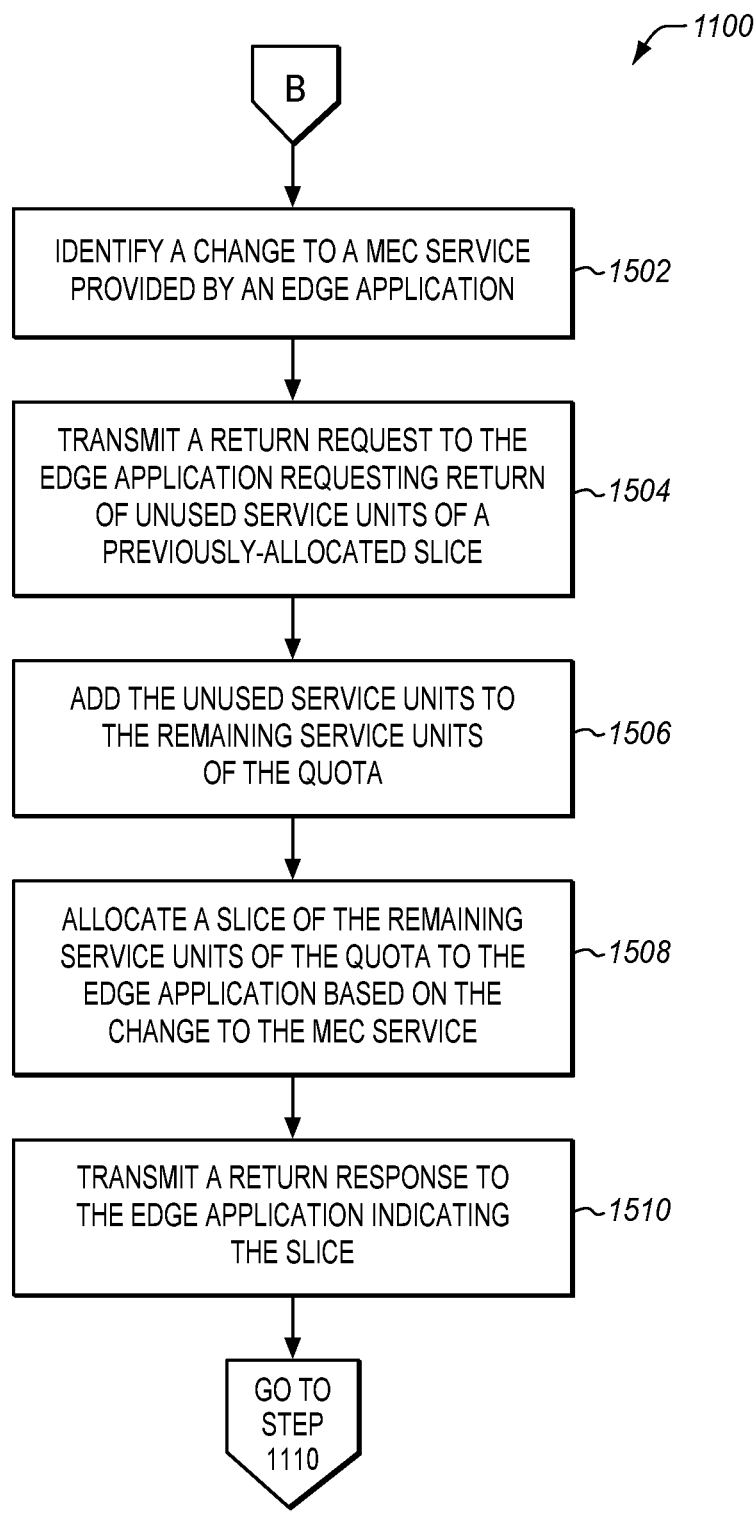
FIG. 15 is a flow chart illustrating additional steps of the method of FIG. 11 responsive to a change to a MEC service in an illustrative embodiment.

In another embodiment, a modification event may be a change to one or more MEC services provided by an edge application 926-928. FIG. 15 is a flow chart illustrating additional steps of method 1100 responsive to a change to a MEC service in an illustrative embodiment. Virtual CTF 1010 identifies the change to a MEC service provided by an edge application 926-928 (step 1502). For example, virtual CTF 1010 may receive an update message from an edge application 926-928 indicating a change to a MEC service description, access type, QoS, etc., during a session. Virtual CTF 1010 transmits a return request to the edge application 926-928 requesting return of unused service units of the slice previously allocated (step 1504). Virtual CTF 1010 adds the unused service units of the slice to the remaining service units in the quota (step 1506). Virtual CTF 1010 manages the quota by allocating another slice of the quota (i.e., the remaining service units) to the edge application 926-928 based on the change to the MEC service (step 1508). In managing the quota, virtual CTF 1010 may acquire new policy rules for UE 132 from SMF element 116. Virtual CTF 1010 may therefore transmit a request to SMF element 116 requesting policy rules for the session involving UE 132 in light of the service change. Virtual CTF 1010 transmits a return response to the edge application 926-928 indicating the new slice allocated to the edge application 926-928 (step 1510). Method 1100 then returns to step 1110 in FIG. 11. Virtual CTF 1010 is therefore able to modify quota consumption without requesting a new quota from SMF element 116. When a MEC service changes in this manner, virtual CTF 1010 may request that each edge application 926-928 return a remaining portion of their slice, and redistribute the remaining balance of the quota to each of edge application 926-928 instead of just allocating another slice to the edge application 926-928 that reported the service change.

Figure 16:
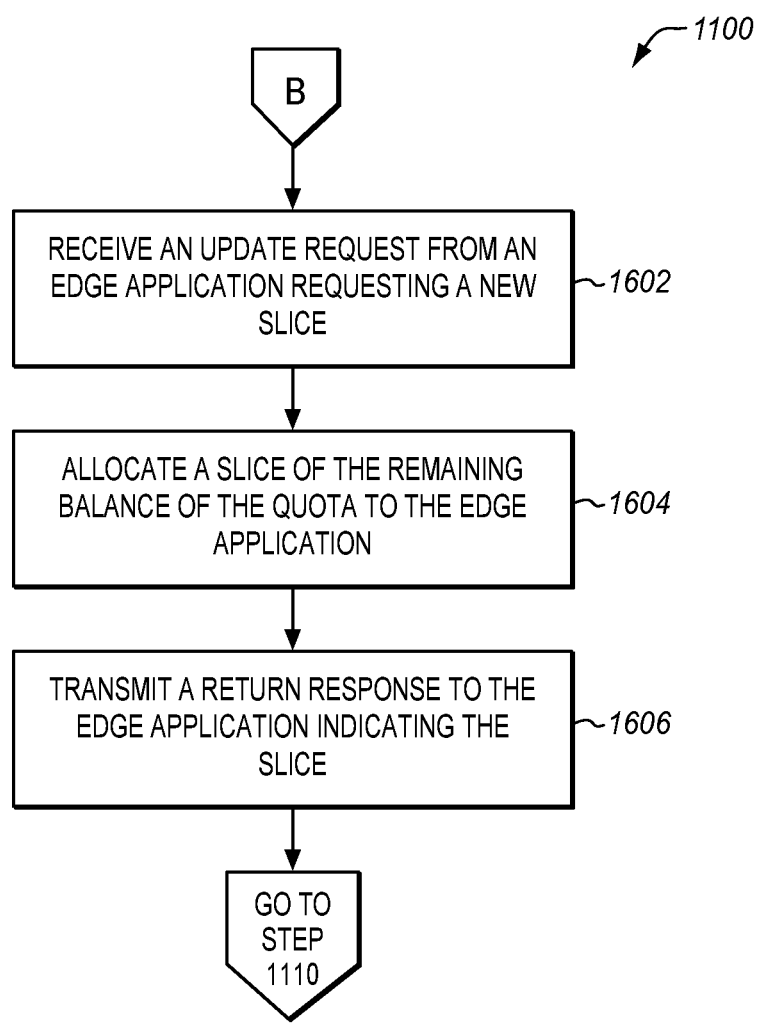
FIG. 16 is a flow chart illustrating additional steps of the method of FIG. 11 responsive to a request for a new slice by an edge application in an illustrative embodiment.

In another embodiment, a modification event may be a request for a new slice by an edge application 926-928. FIG. 16 is a flow chart illustrating additional steps of method 1100 responsive to a request for a new slice by an edge application 926-928 in an illustrative embodiment. Virtual CTF 1010 receives an update request from an edge application 926-928 requesting a new slice (step 1602). As edge application 926-928 provides a MEC service, it may also perform budget control by decrementing a balance of the slice in accordance with resource usage. When or before its slice is depleted, the edge application 926-928 may send an update request to virtual CTF 1010 requesting a new slice. In response to the update request, virtual CTF 1010 allocates another slice of the quota (i.e., from the remaining service units) to the edge application 926-928 (step 1604). Virtual CTF 1010 then transmits a return response to the edge application 926-928 indicating the new slice (step 1606). Method 1100 then returns to step 1110 in FIG. 11. When an edge application 926-928 requests a new slice, virtual CTF 1010 may request that each edge application 926-928 return a remaining portion of their slice, and redistribute the remaining balance of the quota to each of the edge applications 926-928 instead of just allocating another slice to the edge application 926-928 that requested the new slice.

Edge applications 926-928 may periodically send update messages to virtual CTF 1010 indicating resource usage, slice information, etc. Virtual CTF 1010 records credit usage per edge application 926-928 as local measurements (along with other measurement data). Virtual CTF 1010 may report charging information (i.e., credit usage) to SMF element 116 in the middle of the session, such as in response to receiving update messages from edge applications 926-928. SMF element 116 may instruct virtual CTF 1010, via the policy rules, whether and when to send interim reports to SMF element 116 with the charging information.

Figure 17:
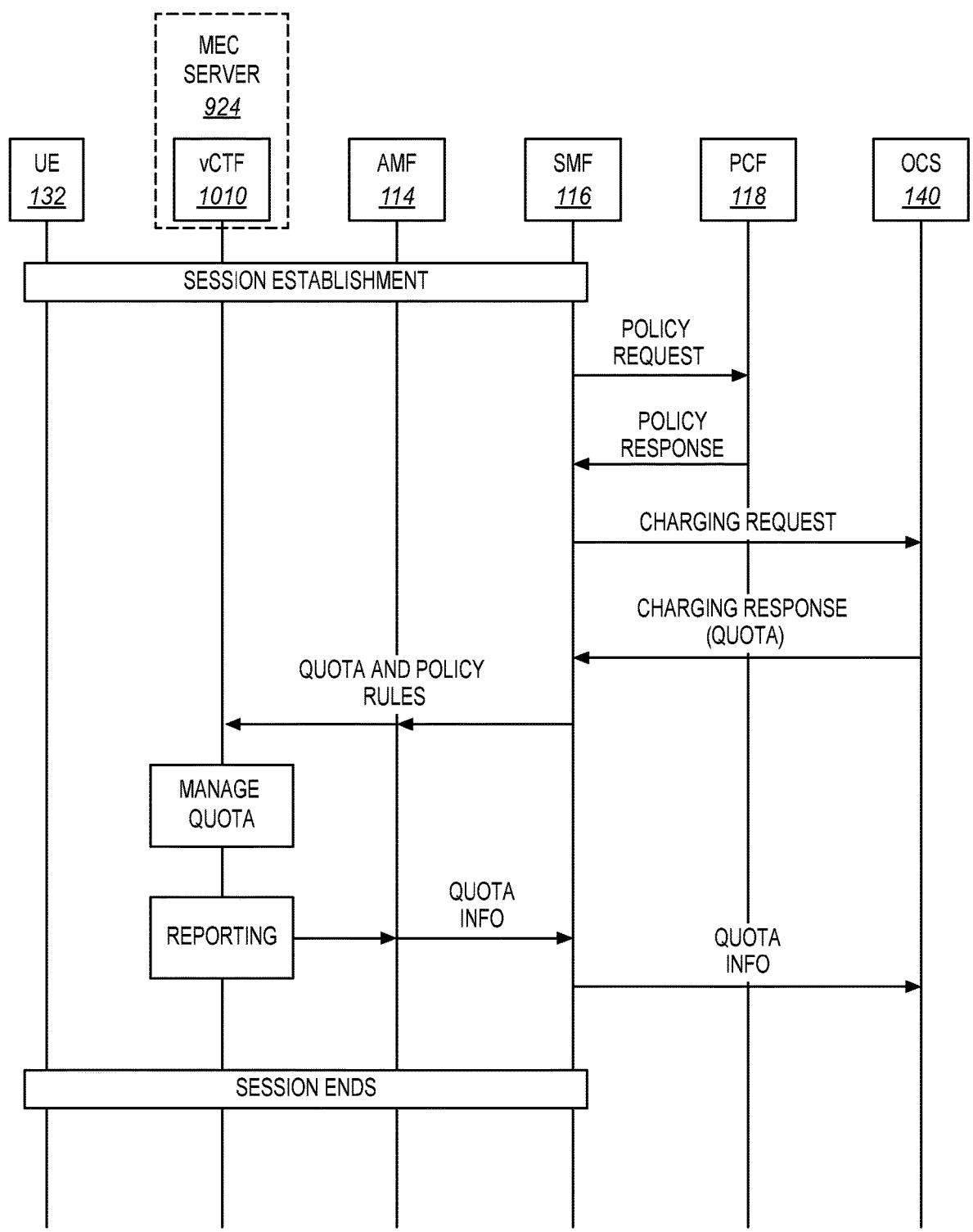
FIG. 17 is a message diagram for quota management in a MEC server in an illustrative embodiment.

FIG. 17 is a message diagram for quota management in MEC server 924 in an illustrative embodiment. To begin, UE 132 establishes a session. Virtual CTF 1010 in MEC server 924 provisions edge applications 926-928 to provide MEC services for the session, and estimates credit needs in the session for the edge applications 926-928. As part of establishing the session, MEC server 924 may send a session establishment message to SMF element 116 (through AMF element 114) including the quota requested. Virtual CTF 1010 may also include a new MEC credit management indication in the session establishment message.

SMF element 116 sends a policy request to PCF element 118 requesting policy rules for the session. Based on service characteristics, session information from MEC server 924, input of UE profiles and/or charging domain, etc., PCF element 116 generates policy rules for MEC credit control, and provides the policy rules to SMF element 116 in a policy response.

SMF element 116 also requests a quota for MEC server 924 from OCS 140. In response to the request, OCS 140 grants a quota for MEC server 924, and provides the quota to SMF element 116. SMF element 116, in turn, forwards the quota and the policy rules for the session to MEC server 924.

Virtual CTF 1010 evaluates quota needs for the edge applications 926-928 and dynamically balances the quota distribution according to the policy rules and/or local policies. Virtual CTF 1010 will intelligently refine policy rules for credit distribution and sharing during the session and/or after the session. To distribute the quota, virtual CTF 1010 allocates slices of the quota to edge applications 926-928 provisioned to provide MEC services for the session. Virtual CTF 1010 monitors quota consumption among the edge applications 926-928. Virtual CTF 1010 may rebalance the quota during the session among edge applications 926-928, which may include: (a) a slice used up in one or more of edge applications 926-928, (b) QoS changes in one or more of edge applications 926-928, (c) one or more of edge applications 926-928 end involvement in the middle of session, (d) edge application 926-928 handovers, or (e) one or more of edge applications 926-928 join/re-join in the middle of session. Virtual CTF 1010 may report quota consumption and redistributions to SMF element 116 in middle of session based on its local provisioning or policy rules. SMF element 116 may update the quota distribution information to OCS 140.

If the session ends, virtual CTF 1010 reports credit quota consumption and surrenders remaining credit to SMF element 116. SMF element 116 updates the quota consumption information to OCS 140.

Any of the various elements or modules shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

As used in this application, the term "circuitry" may refer to one or more or all of the following:

(a) hardware-only circuit implementations (such as implementations in only analog and/or digital circuitry);

(b) combinations of hardware circuits and software, such as (as applicable):
  (i) a combination of analog and/or digital hardware circuit(s) with software/firmware; and
  (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Although specific embodiments were described herein, the scope of the disclosure is not limited to those specific embodiments. The scope of the disclosure is defined by the following claims and any equivalents thereof

What is claimed is:

1. A system comprising:
a Mobile Edge Computing (MEC) server implemented at a Radio Access Network (RAN) of a next generation network that includes a base station, the MEC server comprising:
  an interface component configured to communicate with a Session Management Function (SMF) element implemented in a control plane of the next generation network; and
  a controller configured to implement a plurality of edge applications provisioned to provide MEC services for a session requested by User Equipment (UE) in range of the base station;
  the controller is configured to implement a virtual Charging Trigger Function (CTF) configured to receive a response from the SMF element through the interface component indicating a quota of service units granted for the session, to manage the quota by allocating slices of the quota to the edge applications, and to transmit messages to the edge applications indicating the slices of the quota allocated to the edge applications.

2. The system of claim 1 wherein:
the response received from the SMF element indicates policy rules for the session involving the UE defined by a Policy Control Function (PCF) element implemented in the control plane of the next generation network; and
the virtual CTF is configured to allocate the slices of the quota to the edge applications based on the policy rules.

3. The system of claim 1 wherein:
the virtual CTF is configured to detect a change to the plurality of edge applications provisioned to provide the MEC services for the session, to transmit a return request to the edge applications requesting return of unused service units of the slices, to add the unused service units to remaining service units of the quota, to manage the quota by allocating new slices of the remaining service units of the quota to the edge applications, and to transmit the messages to the edge applications indicating the new slices allocated to the edge applications.

4. The system of claim 1 wherein:
the virtual CTF is configured to identify a change to a MEC service provided by an edge application of the plurality of edge applications, to transmit a return request to the edge application requesting return of unused service units of a slice previously allocated to the edge application, to add the unused service units to remaining service units of the quota, to allocate a new slice of the remaining service units of the quota to the edge application based on the change to the MEC service, and to transmit a return response to the edge application indicating the new slice allocated to the edge application.

5. The system of claim 1 wherein:
the virtual CTF is configured to receive an update request from an edge application of the plurality of edge applications requesting a new slice, to allocate the new slice of remaining service units of the quota to the edge application, and to transmit a return response to the edge application indicating the new slice allocated to the edge application.

6. The system of claim 1 wherein:
the virtual CTF is configured to determine that the quota is consumed during the session, to transmit a replenish request to the SMF element through the interface component requesting a new quota of service units for the session, and to receive a replenish response from the SMF element through the interface component indicating the new quota of service units.

7. The system of claim 1 wherein:
the virtual CTF is configured to determine that the quota is consumed during the session, and to transition from online charging to offline charging for the session responsive to a determination that the quota is consumed during the session.

8. The system of claim 1 wherein:
the virtual CTF is configured to determine a quota consumption status, to determine when a quota threshold is reached, to modify the edge applications or change a Quality of Service (QoS) Flow ID (QFI) to lower a tariff rate for the session, and to shrink an edge application list that shares the quota to make a remaining quota available for a limited set of the edge applications.

9. A method operable in a Mobile Edge Computing (MEC) server at a Radio Access Network (RAN) of a next generation network that includes a base station, the method comprising:
implementing, at the MEC server, a plurality of edge applications provisioned to provide MEC services for a session requested by User Equipment (UE) in range of the base station;
implementing a virtual Charging Trigger Function (CTF) at the MEC server;
receiving, at the virtual CTF, a response from a Session Management Function (SMF) element implemented in a control plane of the next generation network, wherein the response indicates a quota of service units granted for the session;
managing, at the virtual CTF, the quota by allocating slices of the quota to the edge applications; and
transmitting messages from the virtual CTF to the edge applications indicating the slices of the quota allocated to the edge applications.

10. The method of claim 9 wherein:
the response received from the SMF element indicates policy rules for the session involving the UE defined by a Policy Control Function (PCF) element implemented in the control plane of the next generation network; and
allocating the slices comprises allocating the slices of the quota to the edge applications based on the policy rules.

11. The method of claim 9 further comprising:
detecting, at the virtual CTF, a change to the plurality of edge applications provisioned to provide the MEC services for the session;
transmitting a return request from the virtual CTF to the edge applications requesting return of unused service units of the slices;
adding, at the virtual CTF, the unused service units to remaining service units of the quota;
managing the quota at the virtual CTF by allocating new slices of the remaining service units of the quota to the edge applications; and
transmitting the messages from the virtual CTF to the edge applications indicating the new slices allocated to the edge applications.

12. The method of claim 9 further comprising:
identifying, at the virtual CTF, a change to a MEC service provided by an edge application of the plurality of edge applications;
transmitting a return request from the virtual CTF to the edge application requesting return of unused service units of a slice previously allocated to the edge application;
adding, at the virtual CTF, the unused service units to remaining service units of the quota;
allocating, at the virtual CTF, a new slice of the remaining service units of the quota to the edge application based on the change to the MEC service; and
transmitting a return response from the virtual CTF to the edge application indicating the new slice allocated to the edge application.

13. The method of claim 9 further comprising:
receiving an update request at the virtual CTF from an edge application of the plurality of edge applications requesting a new slice;
allocating, at the virtual CTF, the new slice of remaining service units of the quota to the edge application; and
transmitting a return response from the virtual CTF to the edge application indicating the new slice allocated to the edge application.

14. The method of claim 9 further comprising:
determining, at the virtual CTF, that the quota is consumed during the session;
transmitting a replenish request from the virtual CTF to the SMF element requesting a new quota of service units for the session; and
receiving a replenish response at the virtual CTF from the SMF element indicating the new quota of service units.

15. A non-transitory computer readable medium embodying programmed instructions executed by one or more processors, wherein the instructions direct the processors to implement:
a Mobile Edge Computing (MEC) server at a Radio Access Network (RAN) of a next generation network that includes a base station;

the MEC server is configured to communicate with a Session Management Function (SMF) element implemented in a control plane of the next generation network;

the MEC server is configured to implement a plurality of edge applications provisioned to provide MEC services for a session requested by User Equipment (UE) in range of the base station;

the MEC server is configured to receive a response from the SMF element indicating a quota of service units granted for the session, to manage the quota by allocating slices of the quota to the edge applications, and to transmit messages to the edge applications indicating the slices of the quota allocated to the edge applications.

16. The computer readable medium of claim 15 wherein:
the response received from the SMF element indicates policy rules for the session involving the UE defined by a Policy Control Function (PCF) element implemented in the control plane of the next generation network; and
the MEC server is configured to allocate the slices of the quota to the edge applications based on the policy rules.

17. The computer readable medium of claim 15 wherein:
the MEC server is configured to detect a change to the plurality of edge applications provisioned to provide the MEC services for the session, to transmit a return request to the edge applications requesting return of unused service units of the slices, to add the unused service units to remaining service units of the quota, to manage the quota by allocating new slices of the remaining service units of the quota to the edge applications, and to transmit the messages to the edge applications indicating the new slices allocated to the edge applications.

18. The computer readable medium of claim 15 wherein:
the MEC server is configured to identify a change to a MEC service provided by an edge application of the plurality of edge applications, to transmit a return request to the edge application requesting return of unused service units of a slice previously allocated to the edge application, to add the unused service units to remaining service units of the quota, to allocate a new slice of the remaining service units of the quota to the edge application based on the change to the MEC service, and to transmit a return response to the edge application indicating the new slice allocated to the edge application.

19. The computer readable medium of claim 15 wherein:
the MEC server is configured to receive an update request from an edge application of the plurality of edge applications requesting a new slice, to allocate the new slice of remaining service units of the quota to the edge application, and to transmit a return response to the edge application indicating the new slice allocated to the edge application.

20. The computer readable medium of claim 15 wherein:
the MEC server is configured to determine that the quota is consumed during the session, to transmit a replenish request to the SMF element requesting a new quota of service units for the session, and to receive a replenish response from the SMF element indicating the new quota of service units.

* * * * *